US012670703B2

(12) United States Patent
Freytag et al.

(10) Patent No.: US 12,670,703 B2
(45) Date of Patent: Jun. 30, 2026

(54) MICROSCOPY SYSTEM AND METHOD FOR GENERATING A VIRTUALLY STAINED IMAGE

(71) Applicant: Carl Zeiss Microscopy GmbH, Jena (DE)

(72) Inventors: Alexander Freytag, Erfurt (DE); Matthias Eibl, Jena (DE); Christian Kungel, Penzberg (DE); Anselm Brachmann, Jena (DE); Daniel Haase, Zoellnitz (DE); Manuel Amthor, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 271 days.

(21) Appl. No.: 18/565,328

(22) PCT Filed: May 30, 2022

(86) PCT No.: PCT/EP2022/064649
§ 371 (c)(1),
(2) Date: Nov. 29, 2023

(87) PCT Pub. No.: WO2022/253775
PCT Pub. Date: Dec. 8, 2022

(65) Prior Publication Data
US 2024/0282087 A1      Aug. 22, 2024

(30) Foreign Application Priority Data
Jun. 2, 2021      (DE) ..................... 10 2021 114 291.1

(51) Int. Cl.
G06V 10/776      (2022.01)
G06T 11/00      (2026.01)
(Continued)

(52) U.S. Cl.
CPC ............ G06V 10/776 (2022.01); G06T 11/00 (2013.01); G06V 10/774 (2022.01);
(Continued)

(58) Field of Classification Search
CPC .. G06V 10/776; G06V 10/774; G06V 10/993; G06V 20/695; G06V 20/698;
(Continued)

(56) References Cited

U.S. PATENT DOCUMENTS 9,786,050 B2      10/2017   Bhargava
10,013,760 B2      7/2018   Bhargava
(Continued)

FOREIGN PATENT DOCUMENTS

EP            3553165 A1      10/2019
WO      2019241155 A1      12/2019

OTHER PUBLICATIONS

Notice of Allowance for U.S. Appl. No. 18/565,315, filed May 28, 2024, 10 pages.
(Continued)

*Primary Examiner* — Jianxun Yang
(74) *Attorney, Agent, or Firm* — LaBatt, LLC

(57)      ABSTRACT

A computer-implemented method for generating an image processing model that calculates a virtually stained image from a microscope image comprises a training of the image processing model using training data comprising at least: microscope images as input data into the image processing model; target images formed using captured chemically stained images; and predefined segmentation masks that discriminate between image regions to be stained and image regions that are not to be stained. The image processing model is trained to calculate virtually stained images from the input microscope images by optimizing a staining reward/loss function that captures a difference between the (Continued)

virtually stained images and the target images. The predefined segmentation masks are taken into account in the training of the image processing model to compensate errors in the chemically stained images.

22 Claims, 12 Drawing Sheets

(51) Int. Cl.
  *G06V 10/774*       (2022.01)
  *G06V 10/98*        (2022.01)
  *G06V 20/69*        (2022.01)
(52) U.S. Cl.
  CPC .......... *G06V 10/993* (2022.01); *G06V 20/695* (2022.01); *G06V 20/698* (2022.01)
(58) Field of Classification Search
  CPC ................... G06V 10/82; G06T 11/00; G06T 2207/10056; G06T 2207/20081; G06T 2207/20084; G06T 2207/30024; G06T 7/0012; G06F 18/214
  See application file for complete search history.

(56) References Cited

U.S. PATENT DOCUMENTS

| | | | |
|---|---|---|---|
| 2019/0188446 A1 | 6/2019 | Wu et al. | |
| 2020/0302603 A1* | 9/2020 | Barnes .................. | G06T 7/0012 |
| 2020/0394825 A1* | 12/2020 | Stumpe .................. | G16H 30/40 |
| 2021/0304401 A1 | 9/2021 | Lau et al. | |

OTHER PUBLICATIONS

Alvarenga, Lauren, "A Video Introduction to Label-Free Nucleus Detection with TruAI Technology", Olympus Discovery Blog, , https://www.olympus-lifescience.com/en/discovery/a-video-introduction-to-label-free-nucleus-detection-with-truai-technology/, Sep. 2, 2020, 2 pgs.
Christiansen et al., "In Silico Labeling: Predicting Fluorescent Labels in Unlabeled Images", Cell 173, Apr. 19, 2018, pp. 792-803.
Zikry et al., "In and Out of the nucleus: CNN based segmentation of cell nuclei from images of a translocating sensor", PEARC '19, Jul. 28-Aug. 1, 2019, 4 pgs.

Fujita et al., "Cell Detection and Segmentation in Microscopy Images with improved Mask R-CNN", ACCV 2020 Workshops, LNCS 12628, pp. 58-70, 2021.
De Haan et al., "Deep-Learning-Based Image Reconstruction and Enhancement in Optical Microscopy", Proceedings of the IEEE, vol. 108, No. 1, Jan. 2020, pp. 30-50.
Mahmood et al., "Deep Adversarial Training for Multi-Organ Nuclei Segmentation in Histopathology Images", IEEE Transactions on Medical Imaging, vol. 39, No. 11, Nov. 2020, pp. 3257-3267.
Vuola et al., "Mask-RCNN and U-NET Ensembled for Nuclei Segmentation", 2019 IEEE 16th International Symposium on Biomedical Imaging (ISBI 2019), Venice, Italy, Apr. 8-11, 2019, pp. 208-212.
Wieslander et al., "Learning to see colours: generating biologically relevant fluorescent labels from bright-field images", https://www.biorxiv.org/content/10.1101/2021.01.18.427121v3, Jan. 27, 2021, 13 pgs.
Application No. 10 2021 114 290.3, German Search Report (English translation not available), Mar. 22, 2022, 9 pgs.
International Search Report and Written Opinion with English translation for International Application No. PCT/EP2022/064646, dated Oct. 11, 2022, 25 pgs.
Ounkomol et al., "Label-free prediction of three-dimensional fluorescence images from transmitted light microscopy", May 23, 2018, 25 pgs.
Isola et al., "Image-to-Image Translation with Conditional Adversarial Networks", https://arxiv.org/pdf/1611.07004.pdf, Nov. 26, 2018, 17 pgs.
Li et al, "Deep Learning for Virtual Histological Staining of Bright-Field Microscopic Images of Unlabeled Carotid Artery Tissue", Molecular Imaging & Biology, vol. 22, No. 5, Jun. 8, 2020, pp. 1301-1309.
Wang et al., "Deep learning enables cross-modality super-resolution in fluorescence microscopy", Nature Methods, vol. 16, No. 1, Dec. 17, 2018, pp. 103-110.
Jaeger et al., "Retina U-Net: Embarrassingly Simple Exploitation of Segmentation Supervision for Medical Object Detection", Proceedings of Machine Learning Research 116, 2020 Machine Learning for Health (ML4H) at NeurIPS 2019, pp. 171-183.
Application No. 10 2021 114 291.1, German Search Report (English translation not available), Mar. 22, 2022, 11 pgs.
International Application No. PCT/EP2022/064649, International Search Report with English translation, dated Oct. 17, 2022, 7 pgs.

* cited by examiner

MICROSCOPY SYSTEM AND METHOD FOR GENERATING A VIRTUALLY STAINED IMAGE

TECHNICAL FIELD

The present disclosure relates to a microscopy system, a computer-implemented method for generating a virtually stained image, and a computer-implemented method for generating an image processing model that calculates a virtually stained image from a microscope image.

BACKGROUND

In particular in the analysis of biological samples, staining methods are widely used to make certain structures of the sample visible. In histochemical methods, samples are prepared by adding dyes that concentrate, for example, in certain cell organelles or tissue structures. A basic dye can be adsorbed on, e.g., acidic cell structures such as DNA in the cell nucleus, so that the stained structures stand out more from a background or other structures in a captured image. In fluorescence staining, fluorophores emit measurable detection light after irradiation with suitable excitation light. Fluorophores can be naturally contained in samples or be added during a sample preparation. For example, in a transfection staining, DNA or RNA is introduced into a cell, and fluorophores are formed through the expression of the same. An image that utilizes such a chemical staining is also called a chemically stained image in the present disclosure. In transfection staining, certain cell organelles are stained by the formed fluorophores and thus rendered more visible.

Although chemical staining methods advantageously improve the visibility of certain structures, they are also associated with drawbacks. The sample preparation and in particular the dye itself can subject a sample to considerable stress. The illumination in the light microscope can subject the sample to additional stress and result, e.g., in a photobleaching or phototoxicity. Moreover, chemical stainings are not always reliable. For example, there can occur a bleed-through of fluorophores from a structure to be stained. Other sample regions than the structure to be stained are thereby stained. In particular in the case of fluorescence images, sources of interference can also lead to accidentally stained/fluorescent regions. For example, lint on a coverslip or sample carrier can be visible in fluorescence images. In a staining by transfection, in which specific DNA or RNA sequences are introduced into cells for staining, the transfection rate typically does not reach 100%. As a result, some cells do not express fluorophores and are erroneously not visible in fluorescence images.

Virtual staining techniques have been developed in particular in order to avoid subjecting a cell to stress as the result of staining methods. In this case, a microscope image is captured without the use of staining methods, for example a phase-contrast image, from which an image processing model calculates a virtually stained image. Such methods are described, e.g., in EP 3 553 165 A1, U.S. Pat. No. 9,786,050 B2, U.S. Pat. No. 10,013,760 B2 as well as in:

Christiansen, Eric et al., "*In Silico* Labeling: Predicting Fluorescent Labels in Unlabeled Images," 2018, Cell 173, 792-803, Apr. 19, 2018, Elsevier, doi: https://doi.org/10.1016/j.cell.2018.03.040

Ounkomol, Chawin et al., "Label-free prediction of three-dimensional fluorescence images from transmitted light microscopy", bioRxiv preprint, 23.05.2018, https://doi.org/10.1101/289504.

To form an image processing model, training data is typically adopted that comprises microscope images (e.g. phase-contrast images without staining) and chemically stained images (e.g. fluorescence images) registered locally in relation to the former. The microscope images can be used as input data and the chemically stained images can be used as target images (ground truth) in the training of the image processing model. After the training, the image processing model is able to calculate a virtually stained image intended to correspond to a chemically stained image from a microscope image.

As staining methods are not always reliable, as described in the foregoing, the chemically stained images of the training data also contain corresponding errors, in particular structural regions that are erroneously stained or erroneously stained only faintly or not stained at all. If an image processing model is learned using such training data, a moderate quality of the virtually stained images generated by the model is likely. A manual correction of the chemically stained images of the training data is scarcely or not at all possible for a user. While an easy manual correction of the segmentation masks provided in the training is possible with models that are intended to calculate a segmentation mask from an input image (e.g., by drawing an outline around an erroneously unstained cell organelle), it is not possible to correct a chemically stained image manually so simply. Known virtual staining techniques thus produce a quality that is rather in need of improvement.

As background information, reference is made to a method for calculating an output image from an input image using conditional generative adversarial networks:

Isola, Phillip, et al., "Image-to-Image Translation with Conditional Adversarial Networks", arXiv: 1611.07004v3 [cs.CV] 26 Nov. 2018

A training method for calculating segmentation masks from microscope images is also known from:

Alvarenga, Lauren, Olympus Discovery Blog, 2 Sep. 2020, "A Video Introduction to Label-Free Nucleus Detection with TruAI Technology", https://www.olympus-lifescience.com/en/discovery/a-video-introduction-to-label-free-nucleus-detection-with-truai-technology/

Subcellular structures, however, for example where DNA is located within the cell, are not discernible in binary segmentation masks of biological cells. Segmentation masks are thus not a substitute for chemically or virtually stained images.

There thus exists an ongoing need to be able to provide high-quality stained images of microscopic samples while avoiding the subjection of samples to the stress involved in staining methods.

SUMMARY

It can be considered an object of the invention to indicate a microscopy system and method which make it possible to generate stained images of microscopic samples in a highest possible quality and with a minimal subjection of the sample to stress.

This object is achieved by means of the microscopy system with the features of claim 20 and the method with the features of the claim 1 or 17.

An embodiment of the invention relates to a computer-implemented method for generating an image processing model in order to calculate a virtually stained image from a microscope image. The method comprises a training of the image processing model using training data. The training data comprises: microscope images as input data into the image processing model; target images formed using captured chemically stained images that are registered locally in relation to the microscope images and that comprise stained image regions; and predefined segmentation masks that discriminate at least between image regions to be stained and image regions that are not to be stained. The image processing model is trained to calculate virtually stained images from the input microscope images by optimizing a reward/loss function (hereinafter: staining reward/loss function) that captures a difference between the virtually stained images and the target images. The predefined segmentation masks are taken into account in the training of the image processing model to compensate errors in the chemically stained images.

Segmentation masks can be provided for the chemically stained images in a high quality relatively easily. In particular, segmentation masks can be corrected relatively easily, whether manually or in an automated manner. While the chemically stained images in part contain staining errors, higher-quality segmentation masks can be available or generated which do not reproduce the staining errors of the chemically stained images. The segmentation masks can thus be utilized in order to compensate errors in the chemically stained images. A model can thereby be learned that computationally stains given sample structures in a microscope image particularly reliably and accurately. Thanks to the error correction via the predefined segmentation masks, the quality of the images output by the learned image processing model can in principle be even higher than a quality of the captured chemically stained images. In the inference phase (implementation of the image processing model after completion of the training), virtually stained images that correspond to chemically stained images can be generated, which requires solely microscope images such as, e.g., phase-contrast images and does not involve the capture of chemically stained images. It is thus possible to avoid the subjection of a sample to stress involved in chemical staining and/or a subjection of a sample to stress through excitation light. In principle, a simpler or less expensive microscope design can suffice and sample preparation is potentially simplified. Typical errors of chemically stained images can be avoided, e.g. an incomplete transfection as described in the introduction, so that particularly high-quality images can be generated. As a further advantage, it is also possible to employ known tools for the analysis of chemically stained images (e.g., for counting or measuring biological cells or cell organelles in an automated manner) for the generated virtually stained images.

A further embodiment of the invention relates to the implementation of the computer-implemented method for generating an image processing model after completion of the training, that is to say, in an inference mode in which it is meant to process at least one microscope image not seen in the training. This embodiment thus relates to a computer-implemented method for generating a virtually stained image, wherein a microscope image is obtained; using the microscope image, a virtually stained image is calculated by means of an image processing model formed according to the method according to the invention for generating an image processing model.

The invention also relates to a microscopy system with a microscope for image capture and a computing device that is configured to carry out the computer-implemented method according to the invention.

A further aspect of the invention finally relates to a computer program comprising commands that, when the program is executed by a computer, cause said computer to execute a computer-implemented method according to the invention.

Optional Embodiments

Variants of the microscopy system according to the invention and of the method according to the invention are the object of the dependent claims and are explained in the following description.

Staining Reward/Loss Function

In machine-learning methods, a model is learned through an iterative optimization of an objective function. In the present disclosure, the objective function is called a reward/loss function, which can comprise a reward function to be maximized and/or a loss function to be minimized. The staining reward/loss function is the reward/loss function that captures a difference between the virtually stained images output by the image processing model and the associated target images. In a loss function this difference is to be minimized, while in a reward function a correspondence between the virtually stained images and the associated target images is to be maximized. In different variants of the invention, the segmentation masks are additionally used in the calculation of the staining reward/loss function, as described in greater detail in the following.

Utilizing the Segmentation Masks for a Variable Weighting

The predefined segmentation masks can generally be utilized in different ways in the training in order to prevent the image processing model from learning to reproduce errors contained in the chemically stained images.

In the training of the image processing model, the predefined segmentation masks can be taken into account in particular when the target images are formed from the chemically stained images and/or in the staining reward/loss function.

In particular, the predefined segmentation masks can be taken into account for a variable weighting in the staining reward/loss function by weighting differences between the virtually stained images and the target images differently for different image regions as a function of the predefined segmentation masks. Different image regions thereby enter the staining reward/loss function to different extents. By means of the predefined segmentation masks, there occurs an automatic assignment of how different image regions are weighted. The weighting for a pair of a virtually stained image and an associated target image is defined by means of the associated predefined segmentation mask. For other pairs of the training data, the respectively associated predefined segmentation mask results in other weightings.

A weaker weighting can be defined in the case of a discrepancy between an image region of a chemically stained image and the locally corresponding image region of the associated predefined segmentation mask. For example, an image region that is stained in one of the chemically stained images can be given a weaker weighting if this image region is designated as not to be stained (i.e., as background) in the associated predefined segmentation mask. This can reduce the significance of a "bleed-through" in chemically stained images for the training: in a bleed-through, fluorophores, dyes or other substances that bring about the staining leak from the sample structures that are to be chemically stained into a surrounding area. The surrounding area is thus stained in the chemically stained image, while the predefined segmentation mask designates this surrounding area as not stained, i.e., as not to be stained. In the calculation of the reward/loss function, the image region of this surrounding area is weighted with a smaller weighting factor than other image regions, e.g. with a weighting factor of zero or less than 1, while other image regions can receive a weighting factor of 1. The weighting factor can also be defined as a function of an intensity or brightness in this image region of the chemically stained image, wherein the weighting is smaller the greater the intensity. In the event of a stronger bleed-through, the weighting is accordingly particularly low. By means of these weighting rules, it is alternatively or additionally possible to compensate the effects of artefacts that are accidentally stained in the chemically stained images. For example, lint on a sample carrier can cause strong fluorescence signals and thereby lead to stained image regions in the chemically stained image. The image regions of this lint are recorded as "not to be stained" in the predefined segmentation mask, so that the image regions of the lint are not included in the training of the image processing model or only included to a lesser extent.

Additionally or alternatively, it can be provided that a weighting of an image region that is designated as to be stained in one of the predefined segmentation masks is defined as a function of a stain strength (e.g. a fluorescence intensity) of the locally corresponding image region in the associated chemically stained image. The weighting is defined to be lower if the stain strength in the associated chemically stained image is weaker. A limit value for the stain strength can also be predefined and the weighting is only reduced in the event that the stain strength falls below the limit value. This addresses the issue of a sample structure that is only weakly stained (stain underexposure). The model should not learn to generate accidental stain underexposures virtually. The contribution made by such lower-quality image regions to the learning process is thus reduced.

In the variants described in the foregoing, the chemically stained images that contain the errors whose contribution is reduced by the weighting can be used directly as target images. Alternatively or additionally, the error compensation can also occur through a modification of the chemically stained images by means of the predefined segmentation masks in order to form the target images. This is described in greater detail below.

Utilizing the Segmentation Masks to Form the Target Images

The predefined segmentation masks can also be taken into account in the training of the image processing model by changing or deleting given image regions of the chemically stained images with the help of the segmentation masks in order to form the target images.

For example, (masked) target images can be generated from the chemically stained images and the associated predefined segmentation masks by deleting or computationally destaining at least stained image regions of a chemically stained image if the locally corresponding image regions in the associated predefined segmentation mask are designated as not stained, i.e., as not to be stained. This can be the case, for example, in the event of an excessive sample staining (stain overexposure) or in the event of lint on the sample carrier.

An image manipulation can also occur with the help of the segmentation mask in cases of sample regions with an undesirable stain underexposure. This case can be identified whenever an image region is marked as stained (to be stained) in the segmentation mask but the corresponding image region in the chemically stained image has an intensity below a predefined threshold value. For example, the intensity can be defined as the summed or average brightness of all image pixels in an image region, wherein the boundaries of the image region are defined from the segmentation mask. If such an undesirably weakly stained sample region is identified, the corresponding image region can be cut out or deleted. This prevents a negative effect on the training, wherein a remaining image content can still be utilized in the training, so that there remains a large amount of available training data.

Microscope Images and Chemically Stained Images

Chemically stained images can be understood as images of a sample captured by a microscope, wherein at least one dye is visible in the sample which is not visible or only visible to a lesser extent in the microscope image. The dye can be artificially added or can be naturally present in the sample. Depending on its type, the dye only becomes visible through excitation, as, for example, with fluorescent dyes, or the dye is already visible when simply observed. The sample analyzed in the microscope image and in the chemically stained image can be identical for both images, although the dye is not visible or only faintly visible in the microscope image due to the imaging technique. For example, a chemically stained image can be captured in the form of a fluorescence image and the microscope image can be a phase-contrast image. In this case, fluorophores are not visible in the phase-contrast image. In other cases, a microscope image is captured first and then a dye is added, whereupon the chemically stained image is captured. In addition to a fluorophore, a dye can in principle also be any chromophore. With bright-field stains, a chemically stained image can be captured in the form of a transmitted or reflected light image. Dark-field images are also possible, depending on the dye. More generally, a microscope image and a chemically stained image can differ solely by the imaging technique and/or by a sample preparation between the capture of the two images. The qualifier "chemical" in a chemically stained image is intended to be understood as a delimitation from a virtually stained image. In a virtually stained image, a staining is added computationally (virtually), while in a chemically stained image a staining exists due to the sample, i.e. due to its physical or chemical properties. That said, it is not absolutely necessary for a special chemical treatment to occur. A chemically stained image can also be understood as an image with a specific contrast. The specific contrast can be conditional on the aforementioned dyes and is weaker or not contained in the microscope image. For example, the specific contrast can be generated by a particular fluorophore or fluorescence channel, wherein this fluorophore or fluorescence channel is not discernible in the microscope image or only to a lesser extent.

A microscope image and an associated chemically stained image are registered in relation to each other locally, i.e. a sample point has the same image coordinates within both images.

The microscope image can in principle be any image generated with a microscope, in particular a bright-field image, a phase-contrast image or a DIC image (differential interference image). It can also be a fluorescence image captured with one fluorescence channel less than the chemically stained image, so that the missing fluorescence channel is added in the virtually stained image. This reduces the stress to which the sample is subjected due to fluorescence excitation light.

The training data can also comprise more than one associated chemically stained image for each microscope image. For example, different stains of the same sample can be rendered visible in a plurality of chemically stained images. A plurality of predefined segmentation masks are provided in this case, which respectively differ according to the visible dye. A plurality of predefined segmentation masks that are respectively binary masks can also be combined into a single segmentation mask that uses more than two different pixel values. An image processing model learned with such training data can generate from an input microscope image multiple virtually stained images in parallel as output, corresponding to the chemically stained images used in the training.

Predefined Segmentation Masks

A segmentation mask is generally understood to be an image in which different image structures are designated differently. For example, different pixel values can represent the different image structures; in particular, one pixel value can indicate image regions that are to be stained and another pixel value can indicate a background, i.e., image regions that are not to be stained. A segmentation mask can thus in particular be a binary mask. The segmentation mask or semantic segmentation mask can also comprise more than two different pixel values in order to discriminate different sample structures. This can be particularly advantageous if a plurality of different chemically stained images (e.g. different fluorescence images) are used for each microscope image.

The segmentation masks provided in the training can in principle be generated in any manner, in particular from the associated chemically stained image and/or the associated microscope image. Generation can occur automatically, manually or semi-automatically. For example, a segmentation mask can be generated from a chemically stained image and subsequently be manually corrected by a user. Prior to the manual correction, the segmented image regions can correspond locally to the stained image regions of the chemically stained image. In the correction of the segmented image regions, image regions of, e.g., cell organelles are added for which a transfection failed and thus for which a staining is missing in the chemically stained images. The segmented image regions of the predefined segmentation masks thus differ from the stained image regions of the chemically stained images. The segmented image regions are thus also called image regions to be stained in the present disclosure. A user can easily draw corrections in a segmentation mask, while in a chemically stained image erroneous image regions cannot be corrected or cannot be corrected easily by a user. In a simple case, the generation from the chemically stained image can occur via a pixelwise comparison with a predefined threshold value. Alternatively, a machine-learned segmentation model can be used for this purpose.

Advantages of different variants of the invention become particularly apparent when the predefined segmentation masks do not reproduce errors of the associated chemically stained images. Errors can be caused, for example, by lint and/or other contaminations or artefacts which do not belong to a sample to be analyzed and which appear as stained image regions in the chemically stained images. The locally corresponding image regions can be image regions that are not to be stained in the predefined segmentation masks. This can occur, e.g., through manual correction of an automatically generated segmentation mask.

Instead of a manual correction of a segmentation mask, it is also possible to run an artefact detection program in order to generate a predefined segmentation mask. The artefact detection program can be configured to classify stained regions in a segmentation mask as artefacts depending on their shape and/or size. For example, elongated lint usually has a different shape and size than biological cells or cell organelles. Image regions that are classified as artefacts are then registered by the artefact detection program in the segmentation mask as image regions that are not to be stained. A segmentation mask modified in this manner can be used as a predefined segmentation mask. The artefact detection program can be a machine-learned artefact detection model. Training data of the artefact detection model can comprise as input data segmentation masks that were extracted automatically from chemically stained images. Manually corrected segmentation masks can be incorporated in the training data of the artefact detection model as a ground truth or target images. Alternatively, it is possible to design the artefact detection model as an anomaly detector. It is also possible to create a distribution of typical image characteristics from automatically generated segmentation masks or from the associated chemically stained images and to identify outliers of the distribution. The corresponding image regions of the outliers can be automatically registered in the segmentation mask as image regions that are not to be stained. Alternatively, the image regions of the outliers can be displayed to a user with an option of selecting whether these image regions are to be registered in the segmentation mask as image regions that are to be stained or image regions that are not to be stained. Image characteristics for which outliers are identified can be, e.g., a brightness or a contrast in chemically stained images. In automatically calculated segmentation masks, the image characteristics can be, e.g., a size, shape and/or eccentricity of segmented objects. This makes it possible to discriminate, e.g., roundish cells or cell organelles from other objects such as, e.g., smaller dust particles or image noise, or from larger, non-round lint. Alternatively or additionally, a user can also set specifications regarding the size and shape of segmented objects so that, as a function of the same, there occurs a delimitation from artefacts. After a user has manually selected or confirmed a certain number of artefacts, further training data can be automatically searched for similar artefacts. Image regions of these artefacts can then be displayed to a user for confirmation or alternatively indicated directly in associated segmentation masks as not to be stained.

The training data can comprise exactly one predefined segmentation mask per chemically stained image. Alternatively, predefined segmentation masks can only be available for some of the chemically stained images, whereby the described training steps apply to this part of the training data, while for another part of the training data the described error compensation does not occur.

In order to provide predefined segmentation masks, it is further possible that segmentation masks are first generated manually for a part of the chemically stained images or are corrected manually following an automatic generation. The computer program of the invention can then optionally generate segmentation masks automatically for the remaining chemically stained images while taking into account the manually generated/corrected segmentation masks. For example, a search for objects similar to those registered manually in segmentation masks or deleted from automatically calculated segmentation masks can be conducted automatically. Changes to segmentation masks that correspond to the manual specifications can thereby occur in an automated manner. A user can then optionally be requested to verify automatically generated segmentation masks, wherein only segmentation masks that are classified as correct are included in the training data.

The computing device of a microscopy system according to the invention can be configured to display to a user microscope images, associated chemically stained images and an input tool via which the user can draw, correct or verify associated segmentation masks. These segmentation masks are then used as predefined segmentation masks in the training. The generation of these segmentation masks thus enables a user to specify corrections for chemically stained images in a simple manner. A direct correction of the chemically stained images, on the other hand, for example via a manual modification of fluorescence signals or other stainings, would scarcely be possible for a user. It is thus possible with the help of the segmentation masks to specify (in particular manual) corrections for the chemically stained images efficiently. An input tool used for this purpose can comprise, e.g., a software by means of which a user can draw segmentations in an automatically generated segmentation mask and/or in an image layer superimposed on a chemically stained image, in particular per computer mouse or touchscreen.

Image Processing Model Additionally Calculates a Segmentation Mask

The image processing model can optionally be trained to calculate not only a virtually stained image but also a segmentation mask from an input microscope image. In the training, an objective function to be optimized (hereinafter: segmentation reward/loss function) is used, which captures differences between the segmentation masks calculated by the image processing model and the predefined segmentation masks. By optimizing the segmentation reward/loss function, it is achieved that the segmentation masks predicted by the model essentially correspond to the predefined segmentation masks.

This increases the functionality of the image processing model. In addition, the calculation or prediction of a segmentation mask also allows a calculation of a virtually stained image of higher quality to be attained. This is possible, e.g., when in the training a further objective function to be optimized (hereinafter: consistency reward/loss function) is used, which captures a consistency between a virtually stained image calculated by the image processing model and a segmentation mask calculated by the image processing model. An inadequate consistency is penalized in the consistency reward/loss function and thus iteratively eliminated in the training. If the image processing model predicts an image region with a strong staining (e.g. strong fluorescence) in the virtually stained image, while in the predicted segmentation mask the locally corresponding image region is not stained, this inconsistency is penalized. It is likewise penalized via the consistency reward/loss function if an image region with a weak staining is present in the virtually stained image and this image region is designated as stained in the predicted segmentation mask. An improvement in the prediction of the virtually stained image results from the fact that a segmentation can usually be machine-learned relatively quickly and accurately. In the course of the training, the calculated segmentation mask is thus likely to be more accurate than the calculated virtually stained image. By means of the consistency reward/loss function, the higher accuracy of the calculated segmentation mask can thus be exploited to improve the ability of the model to calculate a virtually stained image. The consistency can be quantified, e.g., by calculating a segmentation image from a virtually stained image (e.g., by means of a threshold value comparison or by means of an additional segmentation model) and comparing this segmentation image pixelwise with the segmentation mask calculated by the image processing model.

As a further advantage of the consistency reward/loss function, it is achieved that the image processing model provides consistent results after completion of the training when it is intended to calculate both a segmentation mask and a virtually stained image from an input microscope image.

If the image processing model is intended to calculate a plurality of virtually stained images from an input microscope image, it can be designed to calculate an equal number of segmentation masks. For this purpose, the training data comprises a plurality of different chemically stained images with predefined segmentation masks for each microscope image.

Alternatively or in addition to the consistency reward/loss function, an improvement in the quality of the calculation of a virtually stained image can also be achieved via the segmentation calculation when a special architecture of the image processing model is used. This can have, e.g., an encoder-decoder structure, wherein the same encoder is used with different decoders for the segmentation and the calculation of the virtually stained image. The encoder receives the microscope image as input and calculates a feature vector therefrom. The feature vector is input into a decoder which calculates the segmentation mask therefrom and into a further decoder which calculates the virtually stained image therefrom. As a high-quality result is expected quickly for the training of the segmentation, the encoder should be well-trained relatively quickly, which thus also benefits the calculation of the virtually stained image.

An encoder-decoder structure can also be used when the image processing model is intended to calculate different virtually stained images from the same microscope image, as described, e.g., in the foregoing for a plurality of fluorescence channels. To calculate the different virtually stained images, it is possible to use different decoders but the same encoder. This produces a better quality of results, in particular also because more training data is employed for the adaptation of the encoder.

The aforementioned reward/loss functions can be optimized together in the training, in particular simultaneously. The staining reward/loss function, the segmentation reward/loss function and the consistency reward/loss function can thus be optimized together. This can increase the quality and reliability of the prediction of a virtually stained image.

Autoencoder

Optionally, the image processing model can be supplemented by a further branch for an autoencoder. In this case, the image processing model is trained not only to calculate a virtually stained image and optionally a segmentation mask from an input microscope image, but also to calculate qua autoencoder a microscope image reconstruction. The microscope image reconstruction is a result image that is ideally intended to correspond with the entered microscope image.

The image processing model can comprise, as described, an encoder-decoder structure. In this case, the same encoder is used with different decoders to calculate the virtually stained image, the calculated segmentation mask and the microscope image reconstruction. The aforementioned functions of the image processing model are accordingly learned in a common training. The addition of the autoencoder functionality has a positive effect on the design of the encoder. This accordingly also benefits the calculation of the segmentation mask and the virtually stained image.

If the image processing model is designed to calculate qua autoencoder a microscope image reconstruction from an input microscope image, further advantages result when it is implemented in the inference phase, i.e. after completion of the training. If a microscope image to be analyzed is now fed to the image processing model, a classification as to whether the microscope image appears suitable for the image processing model can occur as a function of differences between the microscope image and the microscope image reconstruction. The differences are small when the input microscope image stems from the statistical distribution of the microscope images used in the training. The differences are large, on the other hand, if no similar microscope images were used in the training, whereby there is a high risk that the microscope image is unsuitable for the image processing model, i.e. it presumably cannot be processed correctly. For this case, it can be provided that a warning is generated together with the virtually stained image. Alternatively, it can be provided that a virtually stained image is only output if the microscope image was classified as suitable by means of the autoencoder.

Follow-Up Training

The training described thus far is particularly advantageous when high-quality segmentation masks can be provided. This often requires manual effort, whereby the number of manually corrected segmentation masks and thus the amount of training data is limited. It can thus be desirable to utilize further training data without increasing the manual effort. This is rendered possible by a follow-up training in which the image processing model, as formed by the training described thus far, is further refined. This involves one of the variants of the image processing model described above in which the image processing model is able to calculate at least one segmentation mask in addition to at least one virtually stained image.

After completion of the training, a follow-up training of the image processing model can be carried out, wherein in the follow-up training (in particular solely) a part of the image processing model that generates virtually stained images is trained further; a part of the image processing model that generates calculated segmentation masks, on the other hand, is kept constant in the follow-up training. Training data comprising microscope images as input data and captured chemically stained images, but in particular no predefined segmentation masks, can be used in the follow-up training. In the follow-up training, the image processing model generates a calculated segmentation mask for each of the input microscope images. This is used to compensate errors in the chemically stained images. Options as described for the predefined segmentation masks in the previous training can be utilized for this purpose. For example, the calculated segmentation masks can be used in order to define weights of image regions in the calculation of the staining reward/loss function. Alternatively or additionally, image regions of the chemically stained images can be destained or deleted based on the calculated segmentation masks, as described above for the predefined segmentation masks.

In a further variant, the training data of the follow-up training also comprises predefined segmentation masks, which are, however, unchecked, e.g., were created automatically and have not been manually corrected. These predefined segmentation masks thus potentially contain errors and can be corrected by means of the segmentation masks calculated by the image processing model. The corrected segmentation masks are then used to compensate errors in the chemically stained images as described for the predefined segmentation masks.

Alternatively, (automatically generated) predefined segmentation masks that have not been checked manually can be compared with segmentation masks calculated by the image processing model for the follow-up training. If a difference between the latter exceeds a predefined threshold value, it is probable that the automatically generated predefined segmentation masks stem from chemically stained images that contain errors. Should the threshold value be exceeded, the corresponding images can thus be removed from the training data of the follow-up training. This ensures that solely high-quality images are used for the follow-up training. At the same time, a manual effort is not required.

In the follow-up training, a consistency reward/loss function to be optimized can be used, which captures a consistency between a virtually stained image calculated by the image processing model and a segmentation mask calculated by the image processing model. Via the consistency reward/loss function, it can be iteratively achieved that stained image regions in the virtually generated images correspond locally with stained image regions of the calculated segmentation masks. This exploits the fact that the image processing model should be able to calculate accurate segmentation masks due to the previous training. If a sample structure is erroneously not stained in the chemically stained images in the follow-up training, this can be compensated by the calculated segmentation mask and the consistency reward/loss function.

Due to the ability of the image processing model to generate calculated segmentation masks in a high quality, it is not necessary to manually correct segmentation masks for an inordinate amount of training data. Available training data (microscope images and associated chemically stained images) can thus be subdivided into a first and a second group, wherein manually corrected segmentation masks are only provided for the first group. The manually corrected segmentation masks are used in the (first) training of the image processing model for the compensation of errors in the chemically stained images. For the second group of training data, on the other hand, the segmentation masks calculated by the image processing model are used for the compensation of errors in the chemically stained images. In particular in these cases, a number of microscope images and associated chemically stained images used in the follow-up training can be greater than a number of microscope images and associated chemically stained images used in the previous training. A manual effort is thereby low for a user even when a large quantity of training data is used, which is desirable for high-quality results.

Inference Phase: Utilizing a Calculated Segmentation Mask

After completion of the training, the image processing model is able in different variants of the invention to generate both at least one virtually stained image and at least one associated segmentation mask from an input microscope image. Depending on a selection of a user, only a virtually stained image, only a calculated segmentation mask or both can be displayed. Moreover, it is also possible to calculate a refined virtually stained image by superimposing the virtually stained image and the associated calculated segmentation mask, in particular by multiplying them pixelwise or via other calculations. By means of the superimposition, image regions of the virtually stained image that are stained (registered as to be stained) in the segmentation mask are stained to a greater extent, while image regions that are not stained (not to be stained) according to the segmentation mask are not stained to a greater extent. For example, the segmentation mask can be formed by a pixel value of 1 for image regions that are not to be stained and a pixel value greater than 1 for image regions that are to be stained. Especially when the image processing model predicts a virtually stained image in which some sample structures are only exhibit an insufficiently strong staining, this circumstance can be compensated if the associated predicted segmentation mask designates the image region of this sample structure as stained.

General Features

A microscopy system denotes an apparatus that comprises at least one computing device and a microscope. A microscope can in particular be understood as a light microscope, an X-ray microscope, an electron microscope or a macroscope.

The computing device can be physically part of the microscope or be arranged separately in the vicinity of the microscope or at a location at any distance from the microscope. The computing device can also be designed in a decentralized manner. It can generally be formed by any combination of electronics and software and comprise in particular a computer, a server, a cloud-based computing system or one or more microprocessors or graphics processors. The computing device can also be configured to control the sample camera, the overview camera, image capture, the sample stage and/or other microscope components.

The sample can be any sample and can comprise, for example, biological cells or cell parts, material samples or rock samples, electronic components and/or objects held in a liquid.

The microscope is configured for an imaging, in particular of microscope images and/or chemically stained images. In some cases, the microscope is configured to capture solely a microscope image, e.g. a phase-contrast image, but not to capture a chemically stained image, e.g. a fluorescence image. Virtually stained images corresponding to chemically stained images can be generated with the microscope in this case via the execution of the trained image processing model, without it being necessary for means for the capture of chemically stained images to be present.

A microscope image cited here can be in principle any raw image captured by a microscope or can be a processed image. The processed image can stem from one or more raw images or already pre-processed images of a microscope. For example, a microscope image can be a perspective-transformed image and/or be formed by joining a plurality of raw images together, wherein the raw images show sample regions that are staggered laterally relative to one another (image stitching). Conversely, a microscope image can also be a section of an image generated with the microscope. It is also possible for the microscope image to be calculated by means of an adjustment of brightness, contrast or tonal values. The microscope image can in particular be an overview image or a sample image or be derived from the same. An overview image is understood to be an image captured by an overview camera, which can be provided in addition to a sample camera of the microscope with which more magnified images (sample images) of a sample region are captured. The overview camera can be attached to a stationary equipment frame, e.g., a microscope stand, or to a movable component, e.g., a sample stage, focus drive or objective revolver. Obtaining an image can in particular comprise the loading of an existing image from a memory or the capture of an image with a camera. The above descriptions can also apply, mutatis mutandis, to the chemically stained image.

Descriptions in the singular are intended to cover the variants "exactly 1" as well as "at least one". The description that a microscope image is input into the image processing model is intended to comprise, for example, the possibilities that exactly one or at least one microscope image is entered. A common input of a plurality of microscope images can be advantageous, e.g., for an input of an image stack (z-stack) consisting of a plurality of microscope images showing sample layers at different depths, or for an input of a plurality of microscope images showing the same sample region captured in succession.

A target image can be understood as an image used in the training of the image processing model that an output (virtually stained image) of the image processing model is intended to approximate. The approximation occurs by means of a reward/loss function, which defines how differences between the output of the image processing model and the target image are evaluated. The evaluation of the differences can occur pixelwise or by comparing more abstract image descriptions, e.g. edge contours. A target image is formed using a captured chemically stained image, that is to say, the target image can in fact be a captured chemically stained image, or the target image can be generated through further processing of a captured chemically stained image. The further processing can comprise, e.g., a calculation with a predefined segmentation mask, as already explained.

An image processing model is understood to be a machine-learned model which receives at least image data as input data and calculates at least one output image therefrom. Learned models described in the present disclosure denote models that have been learned by a learning algorithm using training data. The models can respectively comprise, for example, one or more convolutional neural networks (CNNs), which receive at least one image in the form of the microscope image or an image derived therefrom as input. In a supervised learning process, a respective annotation/label is specified for each microscope image, which annotation/label comprises, as described, a chemically stained image as well as, in different embodiments, a predefined segmentation mask. By means of a learning algorithm, model parameters of the machine learning model are defined using the training data. A predetermined objective function can be optimized to this end, e.g. a loss function can be minimized. The model parameter values are modified to minimize the loss function, which can be calculated, e.g., by gradient descent and backpropagation. In the case of a CNN, the model parameters can in particular comprise entries of convolution matrices of the different layers of the CNN. Layers that do not follow each other directly can optionally be connected by so-called "skip connections", whereby the output of a layer is transmitted not only to the immediately following layer but additionally to another layer. Other deep neural network model architectures are also possible.

The characteristics of the invention that have been described as additional apparatus features also yield, when implemented as intended, variants of the method according to the invention. Conversely, a microscopy system can also be configured to carry out the described method variants. In particular, the computing device can be configured to execute the described method variants. The computing device can also comprise the described computer program. While a ready-trained model is used in some variants, further variants of the invention result from the implementation of the corresponding training steps.

BRIEF DESCRIPTION OF THE FIGURES

Further effects and features of the invention are described in the following with reference to the attached schematic figures.

DETAILED DESCRIPTION OF EXAMPLE EMBODIMENTS

Different example embodiments are described in the following with reference to the figures. As a rule, similar elements and elements that function in a similar manner are designated by the same reference signs.

FIG. 1

Figure 1:
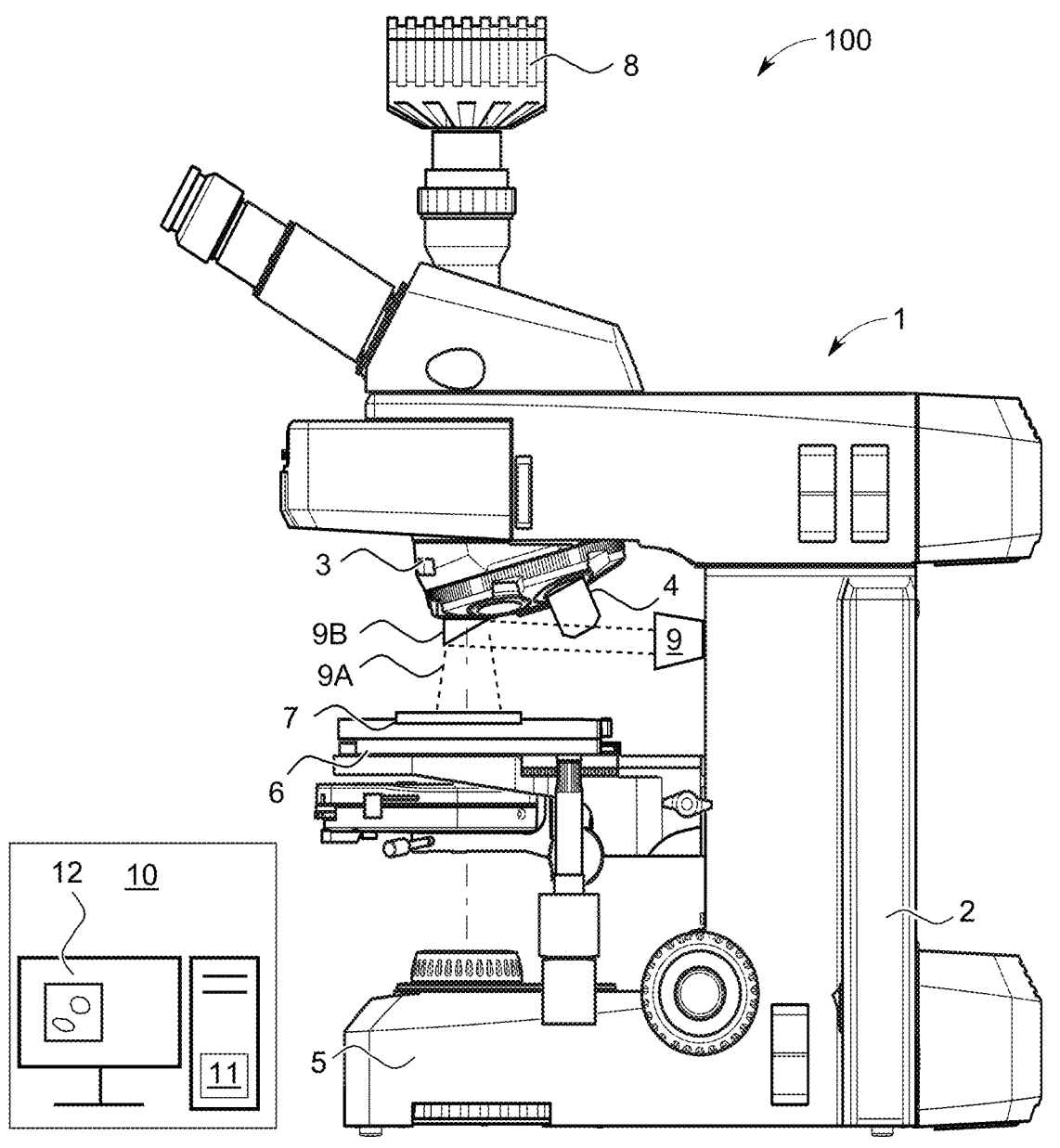
FIG. 1 schematically shows an example embodiment of a microscopy system of the invention.

FIG. 1 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 8. When the objective 4 is pivoted into the light path of the microscope, the microscope camera 8 receives detection light from a sample area in which a sample can be located in order to capture a microscope image. A sample can be any object, fluid or structure. The microscope 1 optionally comprises an additional overview camera 9 for capturing an overview image of a sample environment. The overview image can thus show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror is omitted or a different arrangement of the mirror or a different deflecting element is provided. The computing device 10 comprises an optional touchscreen 12 with which it is possible, among other things, to manually draw segmentation masks or manually correct automatically generated segmentation masks. The computing device 10 also comprises a computer program 11 with an image processing model for processing at least one microscope image, i.e. a sample image or overview image. Such a microscope image, as well as chemically stained images, such as can optionally be captured with the microscope 1, are described in greater detail in the following with reference to FIG. 2.

FIG. 2

Figure 2:
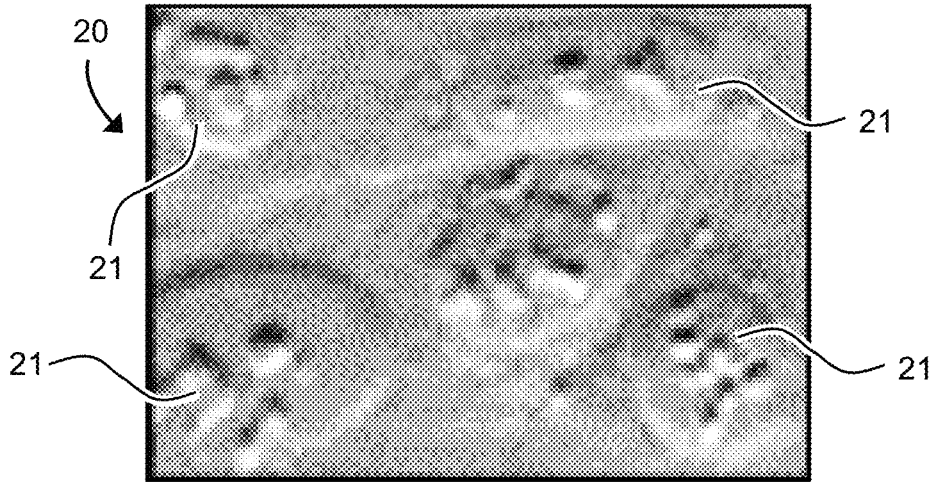
FIG. 2 schematically shows a microscope image and chemically stained images.
Figure 2:
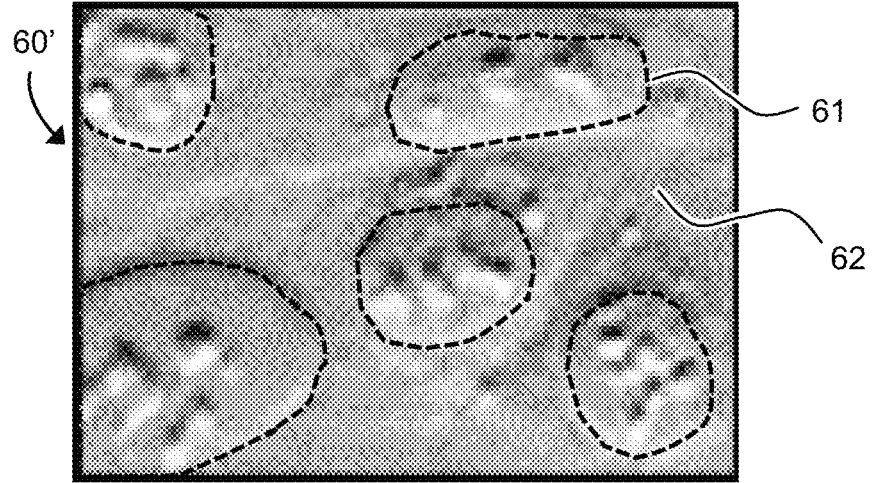
Figure 2:
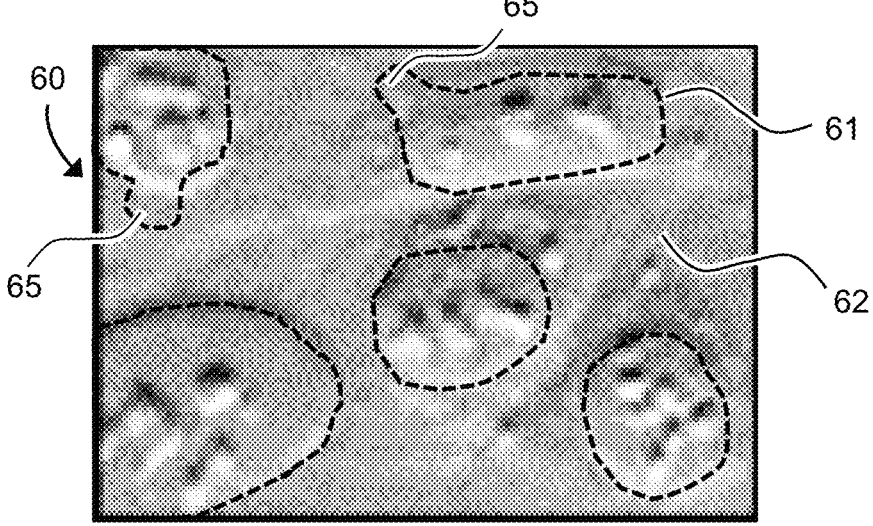

FIG. 2 shows a microscope image 20 captured by the microscope 1, which can be, as illustrated, a sample image. In principle, a microscope image can, however, also be an overview image. In the example shown, the microscope image 20 is a phase-contrast image of a biological sample which comprises a plurality of cell organelles and which can more generally also comprise other structures or cells. A microscope image can also be formed by other imaging techniques, e.g., by differential interference contrast (DIC), by wide-field transmitted light imaging or by means of confocal images. In the example shown, sample structures 21 are visible relatively faintly. A chemically stained image 60' is thus often captured for a clearer analysis of sample structures 21. This can be, e.g., a fluorescence image or a transmitted light image when absorbing dyes have been added to the sample. In FIG. 2, a chemically stained image 60' is shown purely schematically: stained regions 61 are designated by dashed outlines while unstained regions 62 make up the remaining image content. It goes without saying that standard imaging techniques do not result in dashed outlines, but rather in a colour or signal contrast for the regions 61 in opposition to the regions 62. Depending on the imaging technique, the image 60' shown in FIG. 2 can also correspond to a superimposition of a microscope image and a chemically stained image, for example a superimposition of a phase-contrast image with a fluorescence image. In the chemically stained image 60', outlines of certain cell organelles are clearer than in the microscope image 20. More or other details may also be visible inside the chemically stained regions 61 than in the microscope image 20.

While chemically stained images 60' offer advantages, they can also involve a higher expenditure in terms of equipment, a longer sample preparation and/or a greater subjection of the sample to stress due to, e.g., dyes or excitation light. Moreover, chemical stainings can be erroneous. The chemically stained image 60' shows an ideal case in which all cell organelles have been correctly stained. With some staining techniques, however, all structures to be stained are not always actually stained. This problem arises, e.g., in the case of transfections in which DNA or RNA is introduced via which fluorophores are meant to be expressed. If this fails for some cells of the sample, a fluorescence signal is not emitted by all structures to be stained. A further problem arises when dyes escape from chemically stained structures and thereby accidentally stain a surrounding area. Such a case is shown purely schematically in the chemically stained image 60. Besides the intentionally stained image regions 61, image regions 65 are also stained in which dye has accidentally escaped from the cell structures. Further examples of microscope images and associated chemically stained images are described with reference to the following figure.

FIG. 3

Figure 3:
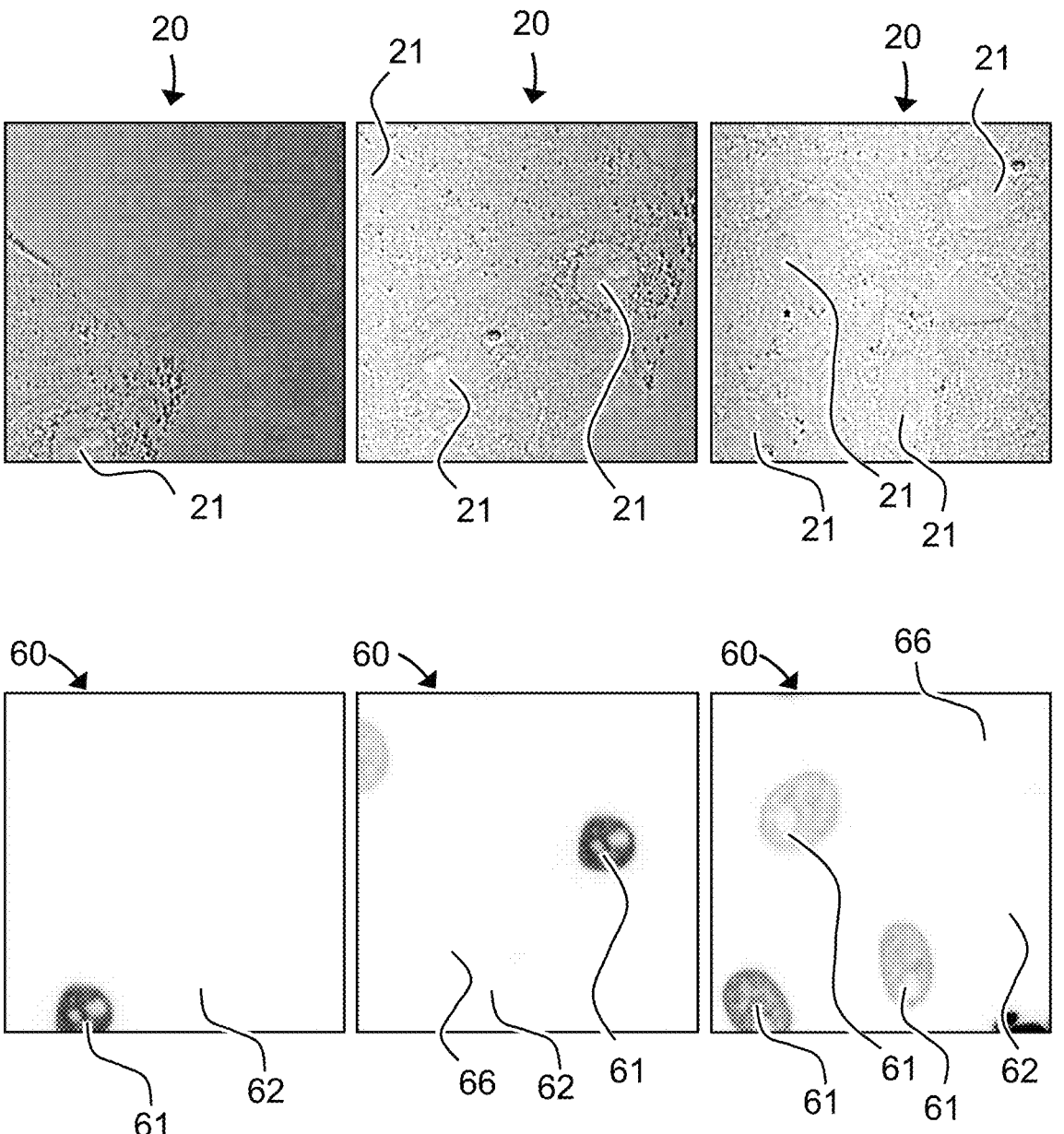
FIG. 3 schematically shows further examples of microscope images and associated chemically stained images.

FIG. 3 schematically shows a plurality of microscope images 20, which in this case are phase-contrast images that respectively contain one or more cell organelles as examples of sample structures 21 to be stained.

FIG. 3 also shows associated chemically stained images 60, which in this case are fluorescence images that are registered locally in relation to the phase-contrast images. All of the sample structures 21 should be stained in the fluorescence images, for example by means of transfection staining. In the illustrated cases, however, the staining process has failed for some sample structures 21, whereby the chemically stained images 60 only comprise stained regions 61 at some locations of sample structures 21. Conversely, other image regions 66 are not stained and thus part of the unstained image region 62 although there are also sample structures 21 to be stained present at these locations.

It is against this background that the invention provides a computer-implemented method in order to generate a stained image (virtually stained image) corresponding to a chemically stained image 60 from a microscope image computationally. As explained in greater detail in the following, drawbacks of a chemical staining, e.g. the erroneous stainings illustrated in the chemically stained images 60, can thereby be overcome.

FIG. 4

Figure 4:
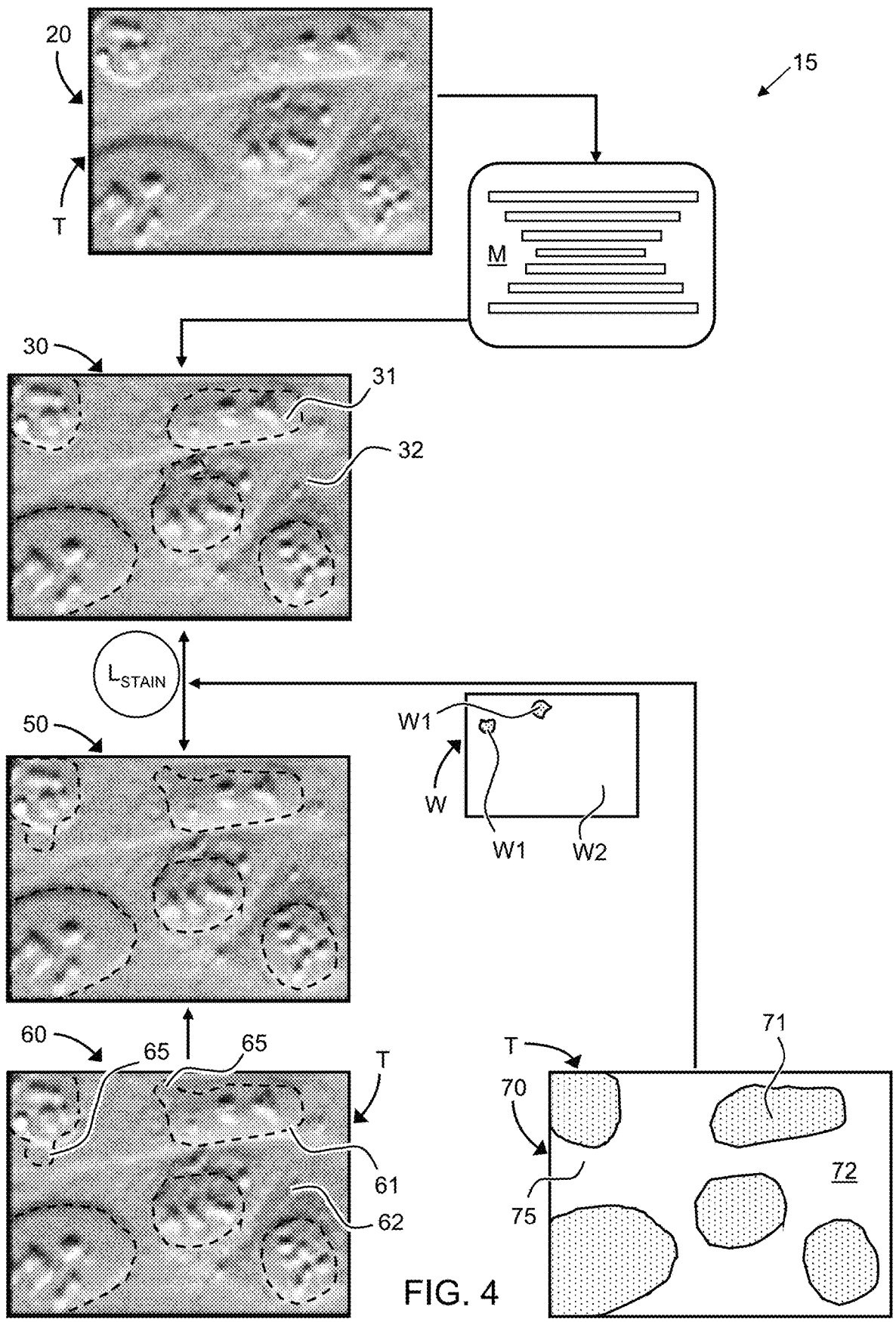
FIG. 4 schematically shows processes of an example embodiment of a method of the invention.

FIG. 4 schematically illustrates an example embodiment of a computer-implemented method according to the invention for generating an image processing model M. The computing device 10 mentioned with reference to FIG. 1 or the computer program 11 are designed to execute this method.

The method comprises a learning process 15 in which the image processing model M is learned by machine learning using training data T, i.e. model parameter values of the model are defined iteratively by means of the training data T. The training data T comprises microscope images 20, chemically stained images 60 and associated segmentation masks 70. FIG. 4 shows by way of example one of the microscope images 20 with the associated chemically stained image 60 and the associated segmentation mask 70.

The microscope images 20 form the input data into the image processing model M, which calculates respective output images (virtually stained images 30) therefrom. The virtually stained images 30 should comprise stained image regions 31 and unstained image regions 32. Target images 50 in this example are precisely the chemically stained images 60, which comprise stained image regions 61 and unstained image regions 62. More generally, the target images 50 can also be images calculated on the basis of the chemically stained images 60. An objective function to be optimized, referred to as the staining reward/loss function $L_{STAIN}$ here, captures differences between the target images 50 and the virtually stained images 30 as calculated with the current values of the model parameters. For example, the staining reward/loss function $L_{STAIN}$ can be a loss function that outputs a greater value, the greater a deviation is between the virtually stained images 30 and the target images 50. The deviation can be captured as a pixelwise difference or by other measures such as, e.g., a so-called perceptual loss. The values of the model parameters are modified by means of backpropagation so that the deviation between the virtually stained images 30 calculated with the model parameters and the target images 50 decreases.

In conventional approaches, no further measures are taken, whereby a model is learned that can essentially predict an image that corresponds to the chemically stained image 60 from a microscope image 20. The chemically stained image 60, however, exhibits staining errors, as also described with reference to FIG. 2: in particular, dye has leaked from two of the stained regions 61 into a surrounding area, whereby two image regions 65 have accidentally been stained. A suboptimal quality of the training data T would have a corresponding impact on the prediction quality of the image processing model M. A manual correction of the chemically stained images 60 of the training data T is not feasible.

The invention, on the other hand, can largely compensate the impact of errors in the chemically stained image 60. Segmentation masks 70 are used to this end that mark, for example by different pixel values, whether the respective pixel belongs to an image region 71 that is to be stained or to an image region 72 that is not to be stained. The segmentation masks 70 are predefined for the training 15 and are thus called predefined segmentation masks 70. For example, in order to generate the predefined segmentation masks 70, segmentation masks can first be calculated from the chemically stained images 60 by a segmentation program, wherein a user then makes manual corrections, for example for the correction of the image regions 65 that have been accidentally stained. This allows high-quality segmentation masks 70 to be provided, which are used in the training 15 to compensate errors in the chemically stained images 60.

In one example embodiment, the segmentation mask 70 is used for a weighting in the staining reward/loss function $L_{STAIN}$. This means that image regions of the target image 50 are weighted to different extents, i.e., that differences between the virtually stained image 30 and the target image 50 are weighted differently for different image regions. A weighting W can be designed, e.g., as a weighting mask that assigns a concrete weighting factor W1, W2 to each pixel. These pixels correspond locally to pixels in the virtually stained image 30 and in the target image 50. The weighting mask W can be multiplied by the target image 50 or the virtually stained image 30 or the corresponding terms in the staining reward/loss function $L_{STAIN}$ which express the pixels from the target image 50 and the virtually stained image 30. A respective weighting or weighting mask W is calculated for each pair of a virtually stained image 30 and an associated target image 50 with the aid of the respectively predefined segmentation mask 70. The weighting mask W can be defined, e.g., by a calculation using the predefined segmentation mask 70 and a segmentation mask formed from the chemically stained image 60 in an automated manner, for example via a threshold value comparison. If a pixel value in these two segmentation masks corresponds (i.e., both segmentation masks correspond in their classification of a pixel as stained or unstained), then this pixel is assigned the weighting factor W2, which can be, e.g., 1. Image regions in which the pixel values of both segmentation masks differ are assigned the weighting factor W1, which is smaller than W2. Image regions 65 that are erroneously stained in the chemically stained image 60 are usually classified as stained in the automatically created segmentation mask, while a locally corresponding image region 75 in the segmentation mask 70 is designated as not stained (not to be stained). Pixels of this image region 65 are thus assigned the smaller weighting factor W1. As a result, image regions 65 that are erroneously stained contribute to a lesser extent to a result of the staining reward/loss function $L_{STAIN}$ than remaining image regions of the chemically stained image 60.

Instead of two different weighting factors W1 and W2, it is in principle possible to use any number of different weighting factors. If the two segmentation masks differ as described above, a weighting factor can be defined that is, e.g., smaller, the greater a stain strength of the pixels in the chemically stained image 60 is. An erroneously stained image region 65 is thus given a weaker weighting, the greater the strength of its staining.

By taking into account the predefined segmentation mask 70 in the staining reward/loss function $L_{STAIN}$, a model can be learned that does not replicate errors in the chemically stained images 60. Rather, the image processing model M outputs a virtually stained image 30 in which image regions that are erroneously stained regions 65 in the associated chemically stained image 60 are not stained. The ready-trained image processing model M is thus able to calculate particularly high-quality virtually stained images 30, while a risk of erroneous stainings can be lower than with standard chemical staining methods. At the same time, the subjection of the sample to stress involved in a chemical staining is avoided when solely a microscope image 20 is captured.

A further case of an erroneous staining in chemically stained images 60 and the compensation of this erroneous staining according to variants of the invention are described with reference to the following figure.

FIG. 5

Figure 5:
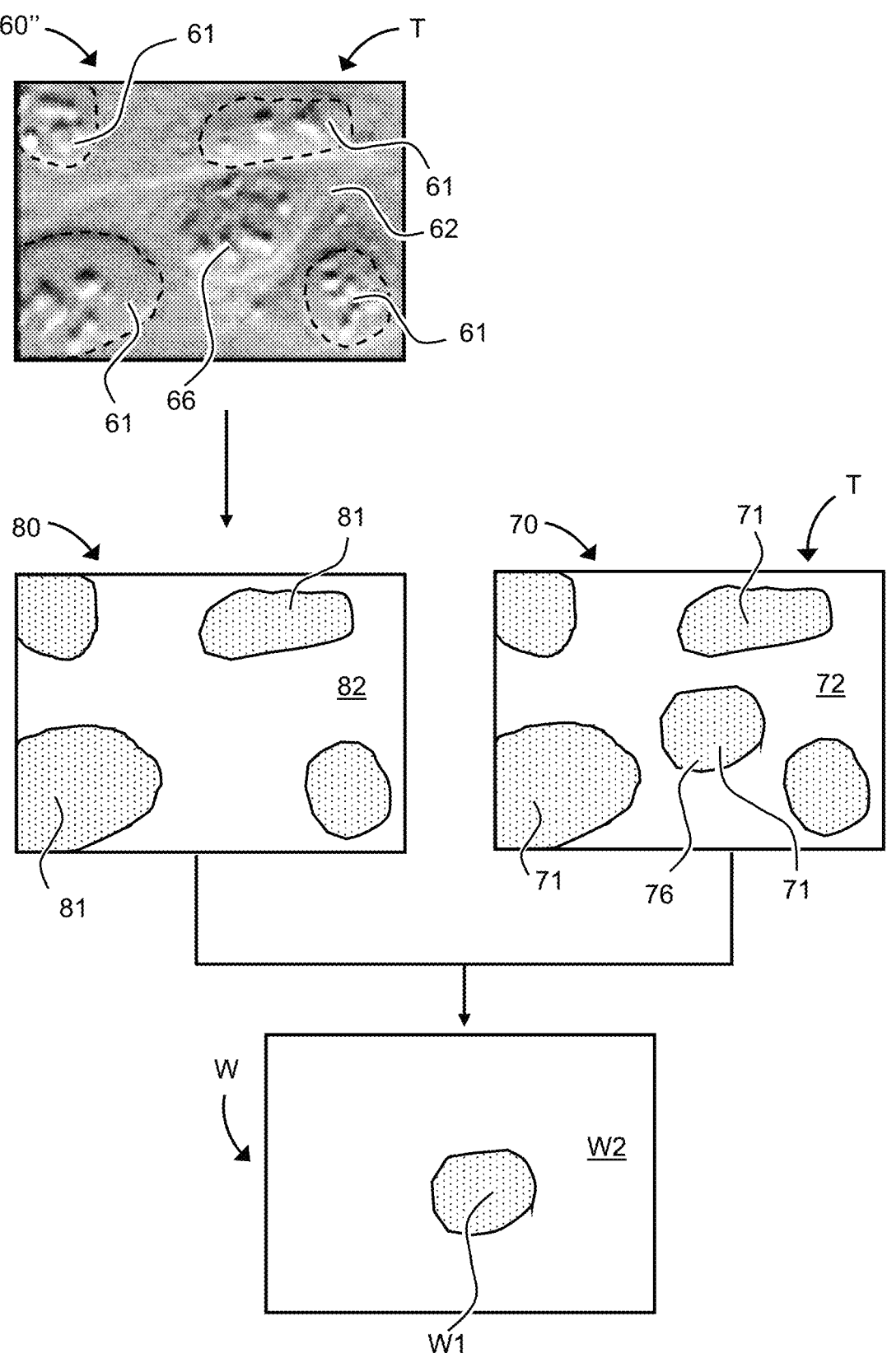
FIG. 5 schematically shows a calculation of a weighting mask according to different example embodiments of a method of the invention.

FIG. 5 shows a further chemically stained image 60" and an associated predefined segmentation mask 70 of the training data T. In this example, a plurality of cell organelles are stained in the chemically stained image 60" while no dyes have leaked from the cells so that stained regions 61 are shaped correctly. In the image region 66, however, a cell organelle has erroneously not been chemically stained. In FIG. 5, the missing staining is expressed by the absence of a dashed outline around this image region 66. In contrast, in the predefined segmentation mask 70, the image region 76 that corresponds locally to the image region 66 is designated as a region 71 to be stained.

In this example, in order to define the weighting mask W, a segmentation mask 80 is first calculated in an automated manner from the chemically stained image 60", e.g., by means of a threshold value comparison for each pixel of the chemically stained image 60" or with the aid of a segmentation computer program. The segmentation mask 80 designates stained image regions 81 and unstained image regions 82.

The weighting mask W is calculated as the difference between the segmentation masks 70 and 80, e.g., as:

$$W = 1 - (\text{segmentation mask } 70 - \text{segmentation mask } 80)^2.$$

The second, squared term can be normalized so that it has a maximum value of 1 (or a maximum value between 0 and 1), whereby a minimum value of the weighting mask W is at least 0 (or at least greater than 0 and less than 1).

In the illustrated example, by means of the weighting mask W, the image region 66 in which the staining is missing in the chemically stained image 60" is given a smaller weighting by the smaller weighting factor W1 than a remaining image content, which is weighted with W2.

It is thus possible by means of predefined segmentation masks 70 to take both the case of a chemically erroneously stained region and the case of a missing chemical staining into account.

A segmentation mask 80 does not necessarily have to be calculated from the chemically stained image to determine a weighting mask. Rather, the predefined segmentation mask 70 can also be used directly in a calculation with the chemically stained image 60". In this case, a stain strength in the chemically stained image 60", e.g. an image brightness or pixel values of a fluorescence channel, is taken into account. The segmentation mask 70 can be used a calculation with the stain strength, which yields continuous weighting factors. The greater the stain strength, the higher a weighting factor can be when the predefined segmentation mask 70 designates an associated image region 71 to be stained. Conversely, the greater a stain strength, the lower a weighting factor is when the predefined segmentation mask 70 designates an associated image region 72 as not to be stained.

The weighting mask W can be utilized as follows: first, a difference between a pixel of the target image 50 and a locally corresponding pixel of the associated virtually stained image 30 is calculated. For example, the two pixels can have values of 20 and 30, whereby the difference has a value of 10. This difference is then multiplied by the locally corresponding pixel or weighting value of the weighting mask, e.g. by a weighting value of 0.5, which yields the contribution in the staining reward/loss function $L_{STAIN}$ 0.5*10=5. In a mathematically similar alternative, the virtually stained image 30 as calculated with current values of model parameters of the image processing model M is first modified before it enters the staining reward/loss function $L_{STAIN}$. To this end, instead of using a pixel of the virtually stained image 30, a superimposition of this pixel and the locally corresponding pixel of the target image 50 is employed, wherein the weighting value indicates the ratio in which the two pixels are superimposed. Taking the above numerical values, the pixel with the value 20 of the virtually stained image is thus superimposed with the pixel with the value 30 of the target image, wherein the superimposition occurs with a weighting value of 0.5, so that the new pixel value is 25. The difference in relation to the pixel value of 30 of the target image is now formed, which again yields 5. In this example, an entire virtually generated image is used in a calculation as follows before entering the staining reward/loss function $L_{STAIN}$:

$$(1 - \text{weighting mask}) * \text{virtually generated image} +$$

$$\text{weighting mask} * \text{target image}$$

This variant embodiment can also be varied by modifying the target image 50 instead of the virtually stained image 30 before the image data enters the staining reward/loss function $L_{STAIN}$. The above descriptions apply with the proviso that the statements pertaining to the virtually stained image and the target image are interchanged.

The predefined segmentation masks 70 do not necessarily have to be taken into account in the training via weights or weighting masks W, as is described in greater detail with reference to the next figure.

FIG. 6

Figure 6:
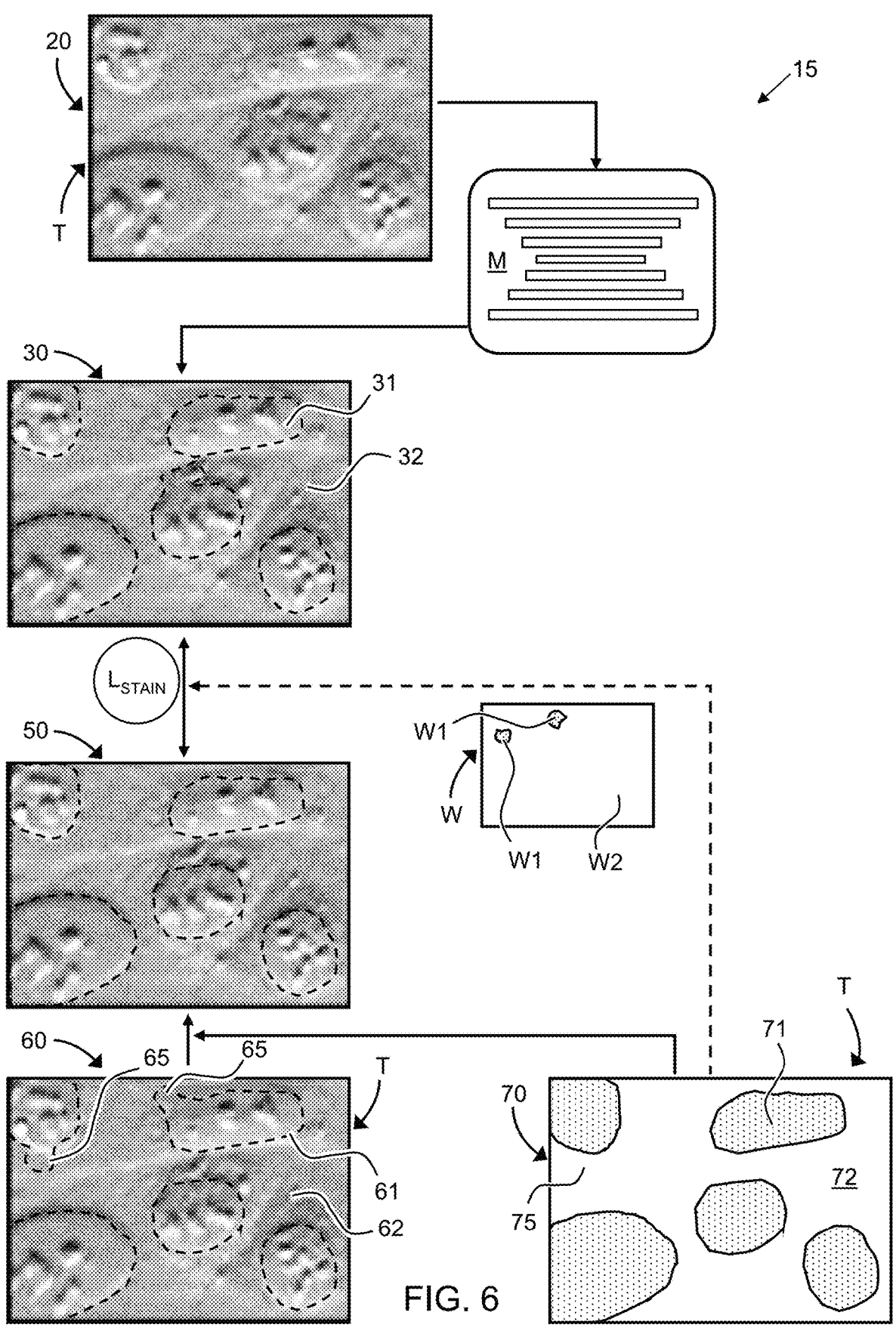
FIG. 6 schematically shows processes of a further example embodiment of a method of the invention.

FIG. 6 schematically illustrates a further example embodiment of a computer-implemented method according to the invention for generating an image processing model M.

This example differs from FIG. 4 in the use of the predefined segmentation masks 70. In this case, the latter are used to process the associated chemically stained images 60 in order to form the target images 50 therefrom. In the case of chemically stained images 60 in the form of, e.g., fluorescence images, a signal originating from the dye (fluorophores) can be processed by means of the segmentation masks 70. If an image region 65 of the chemically stained image 60 shows a signal originating from the dye, while the associated predefined segmentation mask 70 indicates that a staining is not present in the corresponding image region 75, the image region 65 can be processed in order to generate the target image 50. For example, the signal of the image region 65 can be reduced or removed. In particular, a fluorescence channel can be set to zero for this image region 65, whereby this image region, or in the case of a multicoloured chemically stained image 60 one of the colour channels, receives a value of zero. Alternatively, the image region 65 can be cut out so that this image region 65 does not contribute to the training 15. It is also avoided in these ways that an erroneously stained region 65 of the chemically stained image 60 has a negative impact on the training 15 of the image processing model M.

It is not necessary in this example embodiment for the staining reward/loss function $L_{STAIN}$ to comprise a weighting of different image regions. Optionally, however, such a weighting can also be provided, analogously to the example of FIG. 4. A weighting can be utilized, e.g., for cases of a missing staining in the chemically stained image 60, as described with reference to FIG. 5.

FIG. 7

Figure 7:
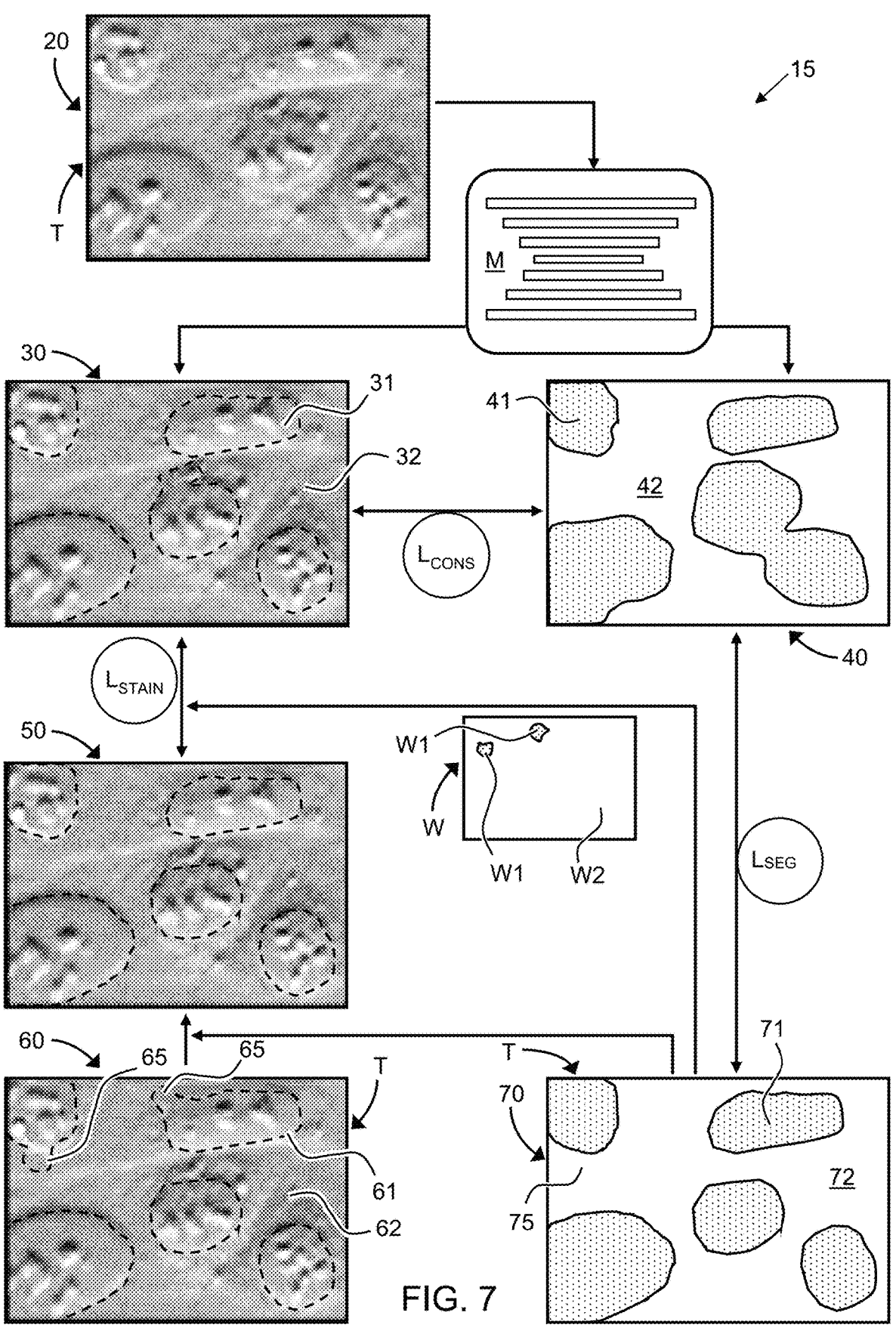
FIG. 7 schematically shows processes of a further example embodiment of a method of the invention.

FIG. 7 schematically illustrates a further example embodiment of a computer-implemented method according to the invention for generating an image processing model M.

The example embodiment of FIG. 7 can comprise the features described with reference to FIG. 4 or 6. In addition, the predefined segmentation masks 70 are also used in order to train the image processing model M to calculate segmentation masks 40 from input microscope images 20. The image processing model M thus generates two output images for each input microscope image 20, namely the virtually stained image 30 and the calculated segmentation mask 40. An objective function to be optimized, referred to as the segmentation reward/loss function $L_{SEG}$ here, captures differences between the predefined segmentation masks 70 and the calculated segmentation masks 40 as calculated with current values of model parameters of the image processing model M. In the learning process 15, the values of the model parameters are iteratively adjusted, e.g. by means of backpropagation, until the difference between the predefined segmentation masks 70 and the calculated segmentation masks 40 has been minimized. With advanced training, stained image regions 41 and unstained image regions 42 in the segmentation masks 40 largely correspond locally with the corresponding image regions 71, 72 of the predefined segmentation masks 70.

An additional objective function to be optimized is used in the training 15, which is referred to as the consistency reward/loss function $L_{CONS}$ in the following and which captures a consistency between the two output images (the virtually stained image 30 and the calculated segmentation mask 40). Consistency should be maximized or any deviation or inconsistency minimized. Consistency is maximal when the stained regions 41 of the segmentation mask 40 are locally identical to the stained regions 31 of the virtually stained image 30. The more the stained regions 31 and 41 deviate locally from one another, the lower the consistency is. For a calculation of the consistency, it is possible, for example, for a segmentation mask to be calculated in an automated manner from the virtually stained image 30, in the simplest case by means of a threshold value comparison, and subsequently for a pixelwise correspondence with the segmentation mask 40 to be determined. This correspondence represents a simple implementation of the consistency reward/loss function $L_{CONS}$.

Advantageously, the functionality of the image processing model M is thereby supplemented by the possibility of being able to provide segmentation masks 40. The consistency between the two output images constitutes an important characteristic here, wherein lies a difference vis-à-vis an independently trained segmentation model of the prior art. This approach also offers advantages for the virtually stained image 30, however: in the course of the training 15, the segmentation provides good results relatively quickly, whereby the consistency reward/loss function $L_{CONS}$ contributes to the appropriate adjustment of the model parameter values for the calculation of the virtually stained image 30. Further advantages due to the calculation of the segmentation masks 40 are described with reference to the following figures.

FIG. 8

Figure 8:
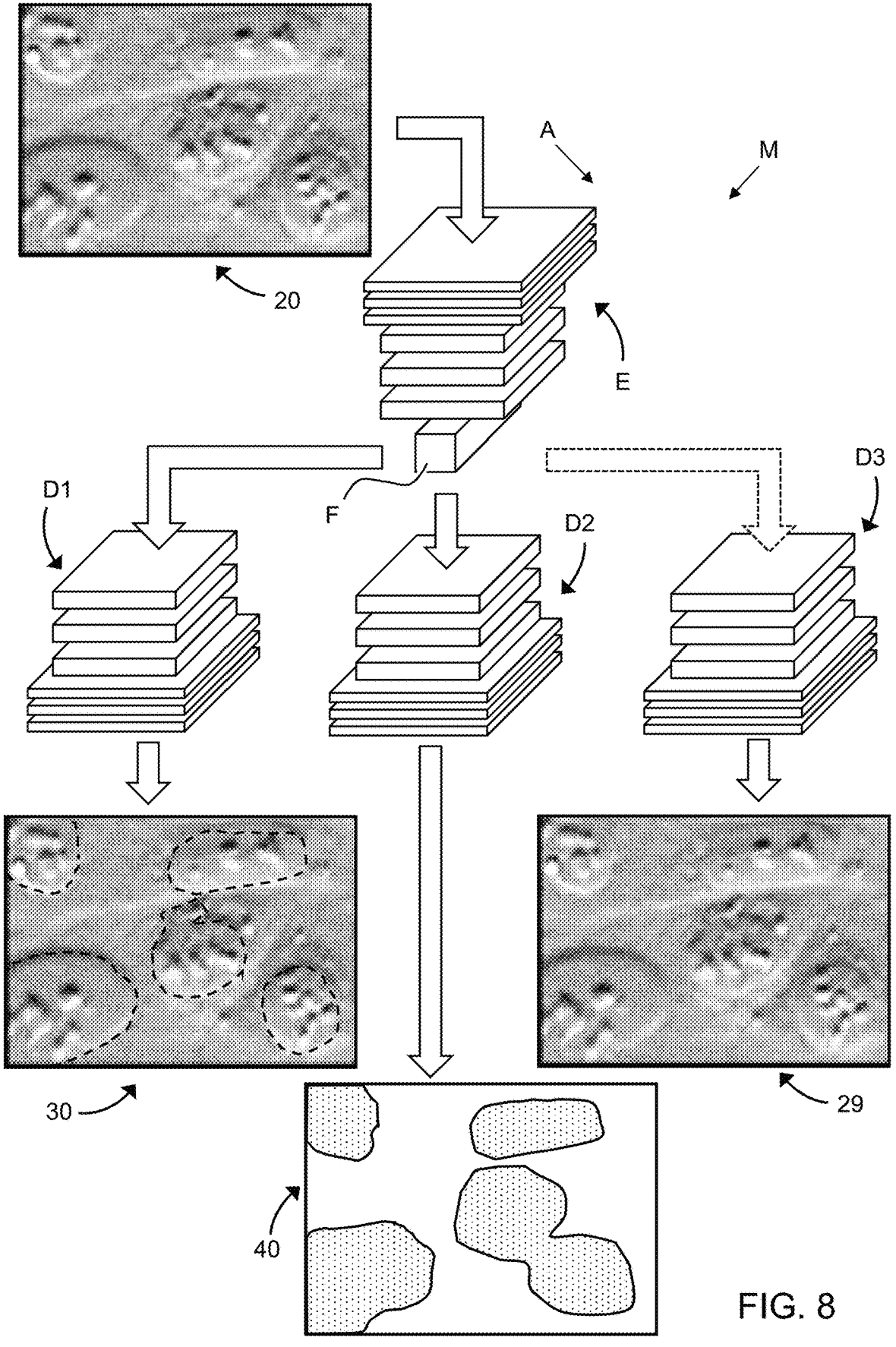
FIG. 8 schematically shows a design of an image processing model M as an encoder-decoder structure according to different example embodiments of a method of the invention.

FIG. 8 schematically illustrates the design of the image processing model M according to different example embodiments of the invention. The image processing model M has an encoder-decoder structure, wherein an encoder E receives the microscope image 20 as input and calculates a feature vector F therefrom. The feature vector F is input into a decoder D1, which generates the virtually stained image 30 therefrom. The feature vector F is also input into a decoder D2, which generates the calculated segmentation mask 40 therefrom. The image processing model M thus uses the same encoder E for the calculation of the virtually stained image 30 and the segmentation mask 40. A training progress in segmentation thus has an immediate positive impact on the training progress in virtual staining.

To clarify, it is noted that the staining reward/loss function $L_{STAIN}$ affects the encoder E and the decoder D1 while the segmentation reward/loss function $L_{SEG}$ affects the encoder E and the decoder D2.

Optionally, the image processing model M can be supplemented by the functionality of an autoencoder A. The autoencoder comprises the encoder E and a decoder D3, which again receives the feature vector F generated by the encoder E. An output image of the decoder D3 should ideally correspond to the input microscope image 20 and is thus referred to as a microscope image reconstruction 29. A reward or loss function of the autoencoder A is optimized in the training for this purpose. The training of the autoencoder A contributes to the particularly rapid ability of the encoder over the course of the training to generate a meaningful feature vector F that reproduces the relevant features of the input microscope image 20 in encoded form, freed from, e.g., random image noise.

The autoencoder A offers a further advantage after completion of the training. If a microscope image to be stained is input into the image processing model M, the autoencoder A can serve to evaluate whether the microscope image to be stained appears suitable for a correct processing. If the microscope image to be stained stems from a statistical distribution of the microscope images 20 seen in the training, the autoencoder A will succeed in reconstructing a microscope image with a high correspondence to the microscope image to be stained. If, on the other hand, the correspondence is low, the microscope image is presumably also unsuitable for a staining by the image processing model M.

FIG. 9

Figure 9:
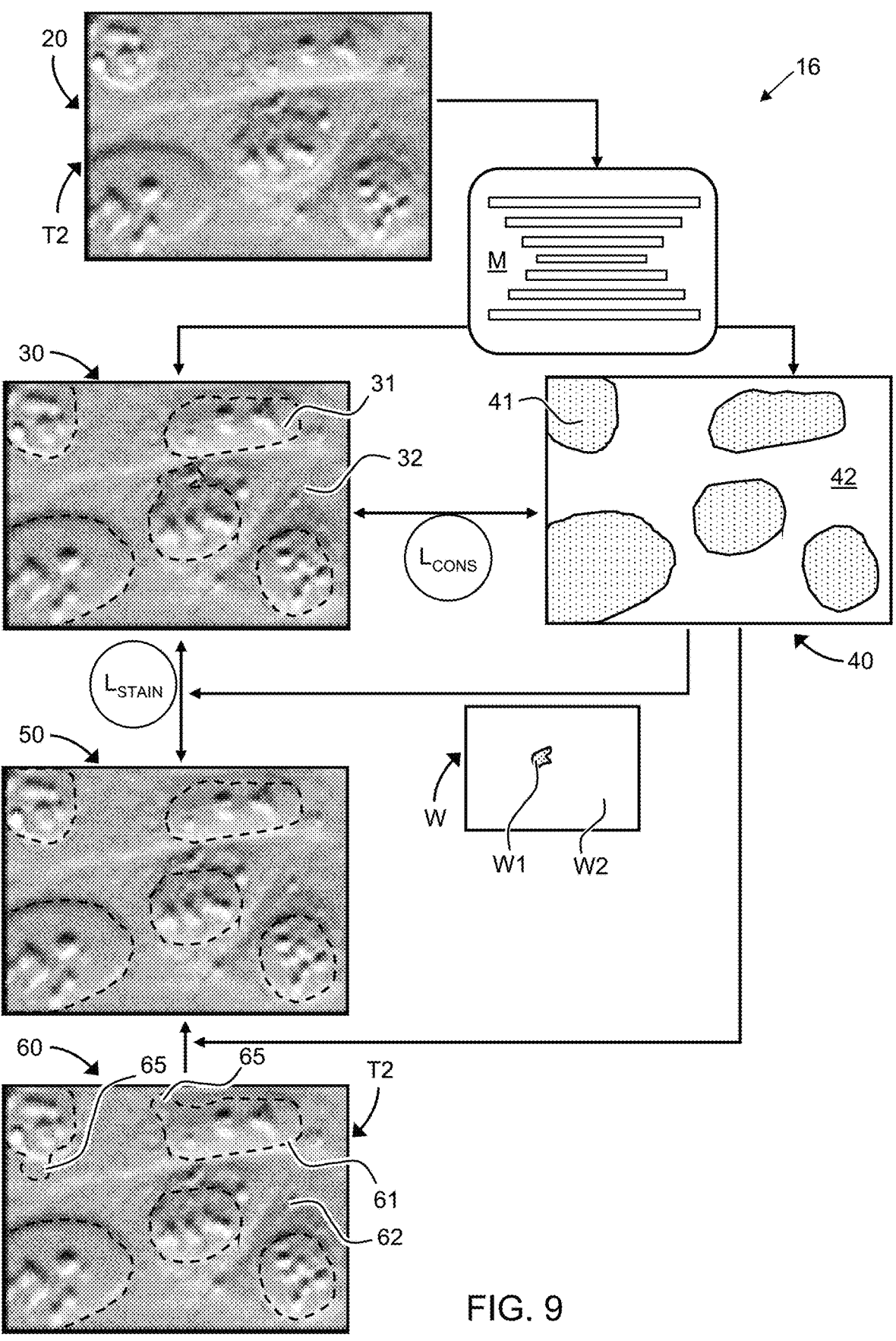
FIG. 9 schematically shows processes of a further example embodiment of a method of the invention.

FIG. 9 schematically shows processes of a further example embodiment of a computer-implemented method according to the invention for generating an image processing model according to the invention.

Steps of a follow-up training 16 that can follow the training 15 of the image processing model M of FIG. 7 are illustrated.

By means of the training 15 shown in FIG. 7, the image processing model M is able to calculate a virtually stained image 30 and an associated segmentation mask 40 with good quality from a microscope image 20. High-quality predefined segmentation masks 70 were used for this training 15, potentially with a greater effort of manual correction. In particular manual effort places limits on the number of realistically available segmentation masks 70 or training data T. More accurate results could possibly be attained with further training data. This is achieved by the follow-up training 16 without, however, an increase in manual effort.

In the follow-up training 16, microscope images 20 and associated chemically stained images 60 are used as training data T2. The training data T2, however, does not comprise (manually corrected) predefined segmentation masks 70. The training data T2 is used to train the image processing model M further, starting with the model parameter values established by the training 15. However, only the part of the image processing model M that calculates virtually stained images 30 is modified in the follow-up training 16. The part of the image processing model M that calculates segmentation masks 40, on the other hand, remains unaltered in the follow-up training 16. In the case of a model structure as shown in FIG. 8, the decoder D1 is trained in the follow-up training 16 while the encoder E and the decoder D2 are kept constant.

A consistency reward/loss function $L_{CONS}$, the goal of which is, as already described, a consistency between the calculated segmentation mask 40 and the virtually stained image 30, can be used again in the follow-up training 16. It is assumed that a segmentation can be learned relatively quickly with high quality. The segmentation mask 40 should thus indicate areas to be virtually stained very reliably in the follow-up training 16 and can thus be utilized to train the part of the image processing model M that calculates the virtually stained image 30.

Moreover, in the follow-up training 16, the segmentation mask 40 calculated by the image processing model M can take the place of the predefined segmentation mask 70 in the previous training 15. The calculated segmentation mask 40 can thus be used to compensate errors in the chemically stained images 60. This can occur by means of a weighting in the staining reward/loss function $L_{STAIN}$ and/or by means of a modification of the chemically stained image 60 in order to form the target image 50 therefrom. The descriptions relating to the use of the predefined segmentation mask 70 in the training 15 of FIGS. 4-7 can apply, mutatis mutandis, to the use of the calculated segmentation mask 40 in the follow-up training 16.

In the follow-up training 16, alternatively or additionally to the consistency reward/loss function $L_{CONS}$, the virtually stained image 30 can be masked or processed by means of the calculated segmentation mask 40. That is to say, the image regions 41, 42 marked as stained or unstained in the segmentation mask 40 can be used in order to make changes in the virtually stained image 30. This can occur in the same way as described for the predefined segmentation masks 70 and the chemically stained images 60. In this case, the staining reward/loss function $L_{STAIN}$ can be calculated between the virtually stained images 30 and the associated target images 50 after the virtually stained images 30 have been masked or processed.

In practical implementations, before the start of the training 15 and the follow-up training 16, the available training data can be divided into a first set of training data T for the training 15 and a second set of (second) training data T2 for the follow-up training 16. Particularly good results can be attained with moderate manual effort when the amount of training data T is chosen so as to be smaller than the amount of training data T2.

Segmentation masks are then generated for the chemically stained images of the training data T and manually corrected in order to generate the predefined segmentation masks 70. The training data T2 does not involve such a manual effort. As a result, an image processing model M can be learned that can generate virtually stained images 30 with a particularly high quality.

FIG. 10

Figure 10:
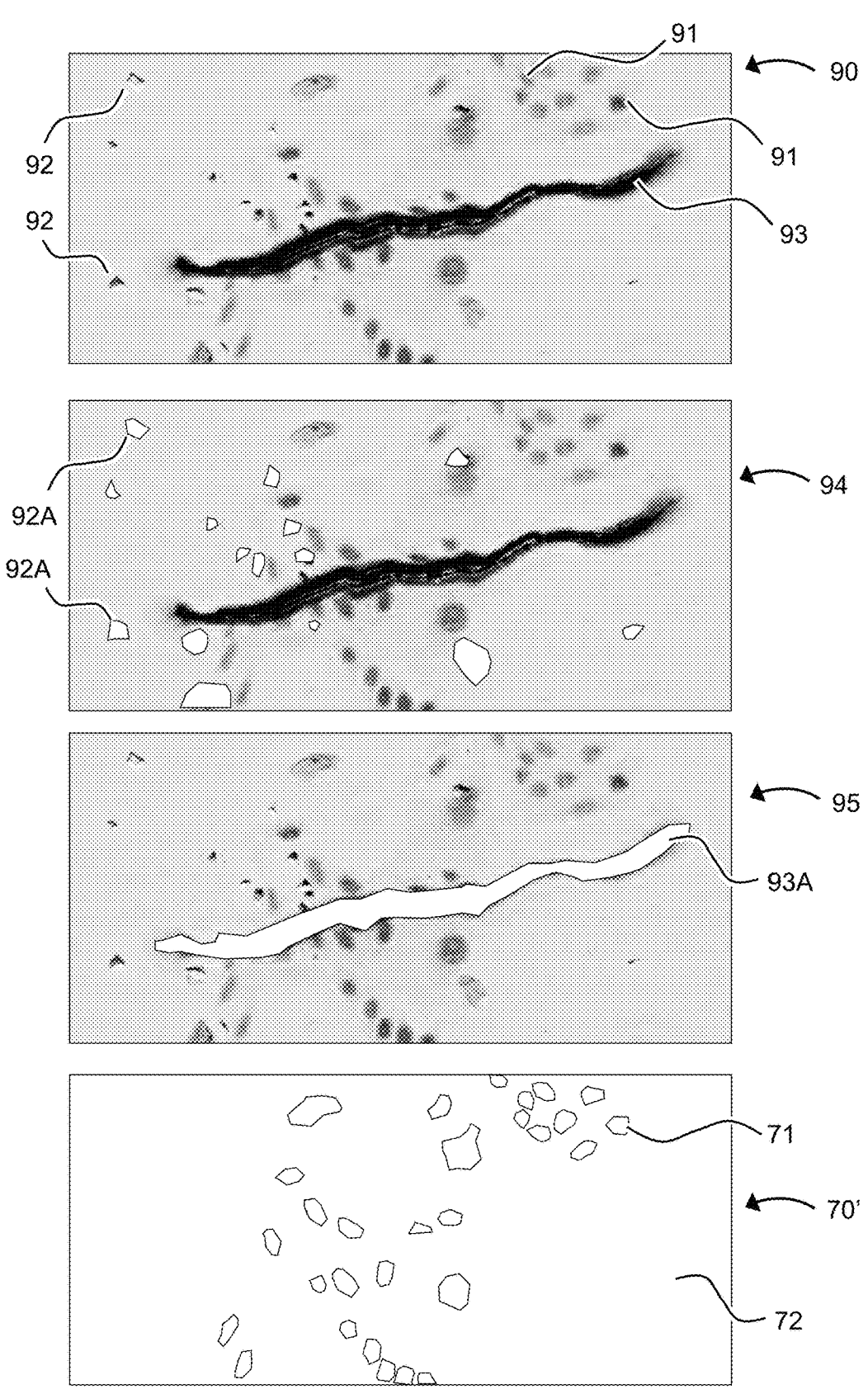
FIG. 10 schematically illustrates the generation of a predefined segmentation mask, according to different example embodiments of a method of the invention.

FIG. 10 illustrates how a predefined segmentation mask 70' can be formed. The example relates to the case of a chemically stained image 90 in which stained image regions result not only from samples 91, but also from lint 93, which can be present, e.g., on a coverslip or sample carrier. In particular in chemically stained images 90 in the form of fluorescence images, lint 93 can deliver a strong signal that should be distinguished from signals of the sample 91. Depending on the staining technique, other artefacts 92 such as dust particles, water drops, scratches, fingerprints or other contaminations can also lead to an interfering signal.

The illustration of a chemically stained image 90 shown in FIG. 10 is again intended to be understood as a merely schematic representation. Stained regions are illustrated here in dark or black. In the case of a fluorescence image, the illustration shown corresponds to a combination with a microscope image, e.g., with a bright-field or phase-contrast image.

The image 94 corresponds to a superimposition of the chemically stained image 90 and a segmentation of image regions 92A of the dust particles or artefacts 92. The image 95 corresponds to a superimposition of the chemically stained image 90 and a segmentation of image regions 93A of the lint 93. The segmentations of the image regions 92A and 93A can be calculated automatically or drawn manually, for example using the touchscreen of FIG. 1. The segmentation of the image regions 92A and 93A is utilized to generate a high-quality segmentation mask 70'.

In the segmentation mask 70', only the image regions 71 of the sample 93 of the chemically stained image 90 are designated as image regions to be stained (illustrated here by an outline), while all other image regions 72 are designated as background or as "not to be stained". The segmentation mask 70' can be formed as a binary mask in which the image regions 71 and 72 are identified by two different pixel values. The image regions 92A and 93A of lint or other artefacts can, thanks to the segmentation from the images 94 and 95, now be registered as part of the unstained image region 72 of the segmentation mask 70'.

If the segmentation mask 70' is used in the training 15 of the image processing model M, then a model is learned that calculates a virtually stained image in which image regions of lint, dust particles and other artefacts are advantageously not stained from an input microscope image in which a piece of lint, dust particle or other artefact is visible. It is thus advantageously also possible to implement variants of the invention in order to reduce the effects of artefacts such as dust or lint in the case of samples in which all sample regions are correctly stained and no dye has accidentally leaked into a surrounding area.

If the formation of the segmentation mask 70' is in part carried out manually, the described two-part training method via the training 15 and the follow-up training 16 is suitable. However, depending on the application, segmentation masks 70, 70' can also be generated fully automatically, as described in greater detail with reference to the following figure.

FIG. 11

Figure 11:
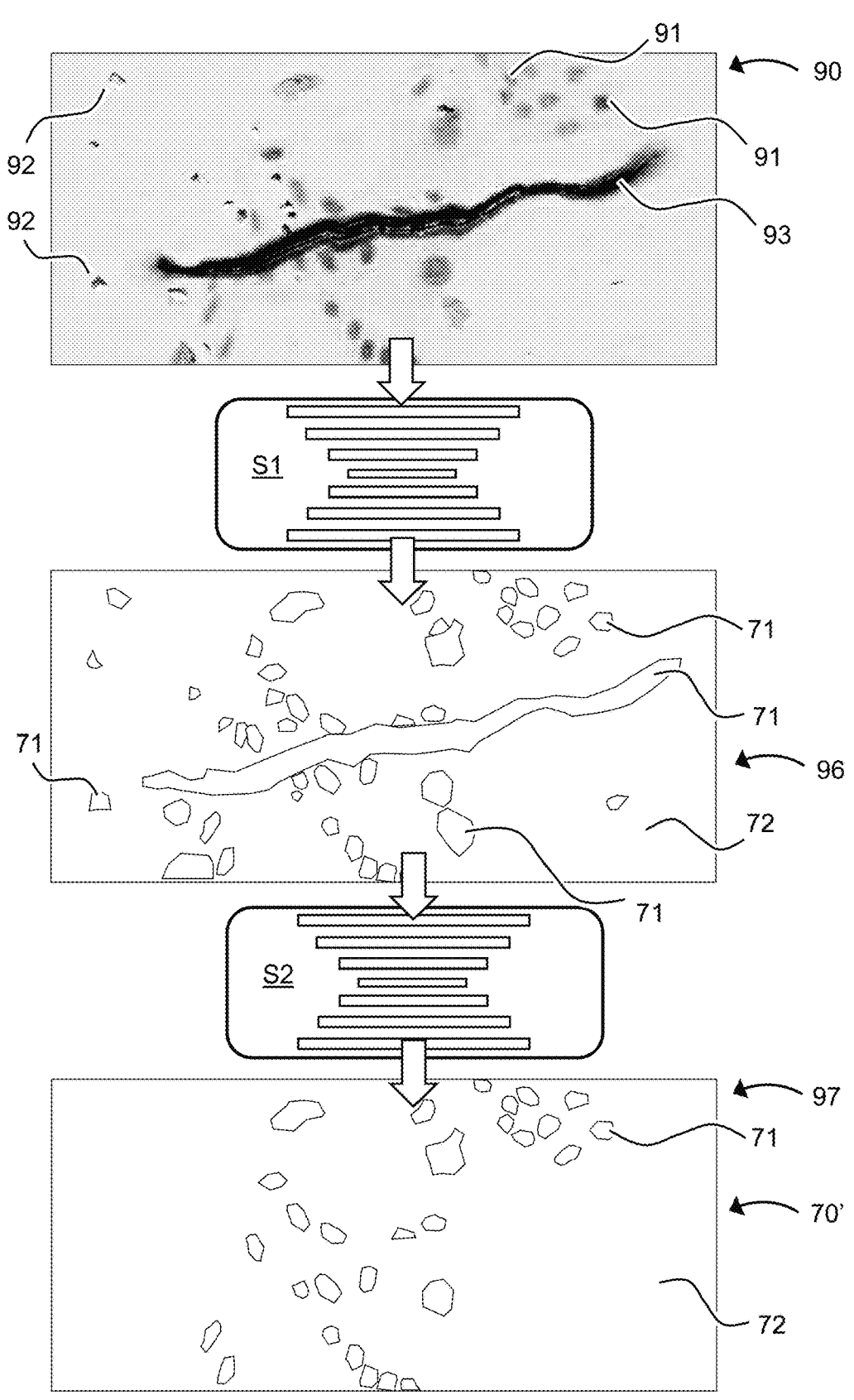
FIG. 11 schematically illustrates the generation of a predefined segmentation mask, according to further example embodiments of a method of the invention.

FIG. 11 illustrates how a high-quality segmentation mask 97 can be automatically calculated from the chemically stained image 90 and then used as a predefined segmentation mask 70, 70' in the training of the image processing model.

First, the chemically stained image 90 is entered into a segmentation program S1, which calculates a segmentation mask 96 therefrom. The segmentation program S1 can be a machine-learned segmentation model or a classically programmed algorithm that calculates the segmentation mask 96, e.g., by means of a threshold value comparison and/or by finding closed shapes.

In the segmentation mask 96, image regions 71 are designated as foreground/as stained, while remaining image regions 72 are designated as background/as not stained. The image regions 71 also comprise the image regions of the lint 93 and of the contaminations or other artefacts 92.

The segmentation mask 96 is now input into an artefact detection program S2, which detects the image regions of the lint 93 and of the other artefacts 92 and removes them from the segmentation mask 96 in order to generate the corrected segmentation mask 97. The artefact detection program S2 can decide, e.g., based on the shape and/or size of segmented image regions 71 whether the respective image region 71 is categorized as a sample or as an artefact. This can occur by means of a classical algorithm or by means of a machine-learned model. The machine-learned model can be learned, e.g., using training images that comprise images corresponding to the segmentation mask 96 as input data and manually generated images corresponding to the corrected segmentation mask 97 as target data. Alternatively, the model can be trained in an unsupervised learning process to detect anomalies. In this case, the model only receives correctly formed segmentation masks or sections of the same as input data, so that an image region 93A, 92A of a piece of lint or other artefact is discerned as an anomaly by the ready-trained model. The image region of an anomaly can then be removed or marked as not to be stained.

The segmentation masks allow, as described, an improvement in virtually stained images to be achieved. In principle, these can be qualitatively superior to chemically stained images without the need for the subjection of the sample to stress and the expenditure in terms of equipment involved in a chemical staining. The use of a ready-trained image processing model is described in the following.

FIG. 12

Figure 12:
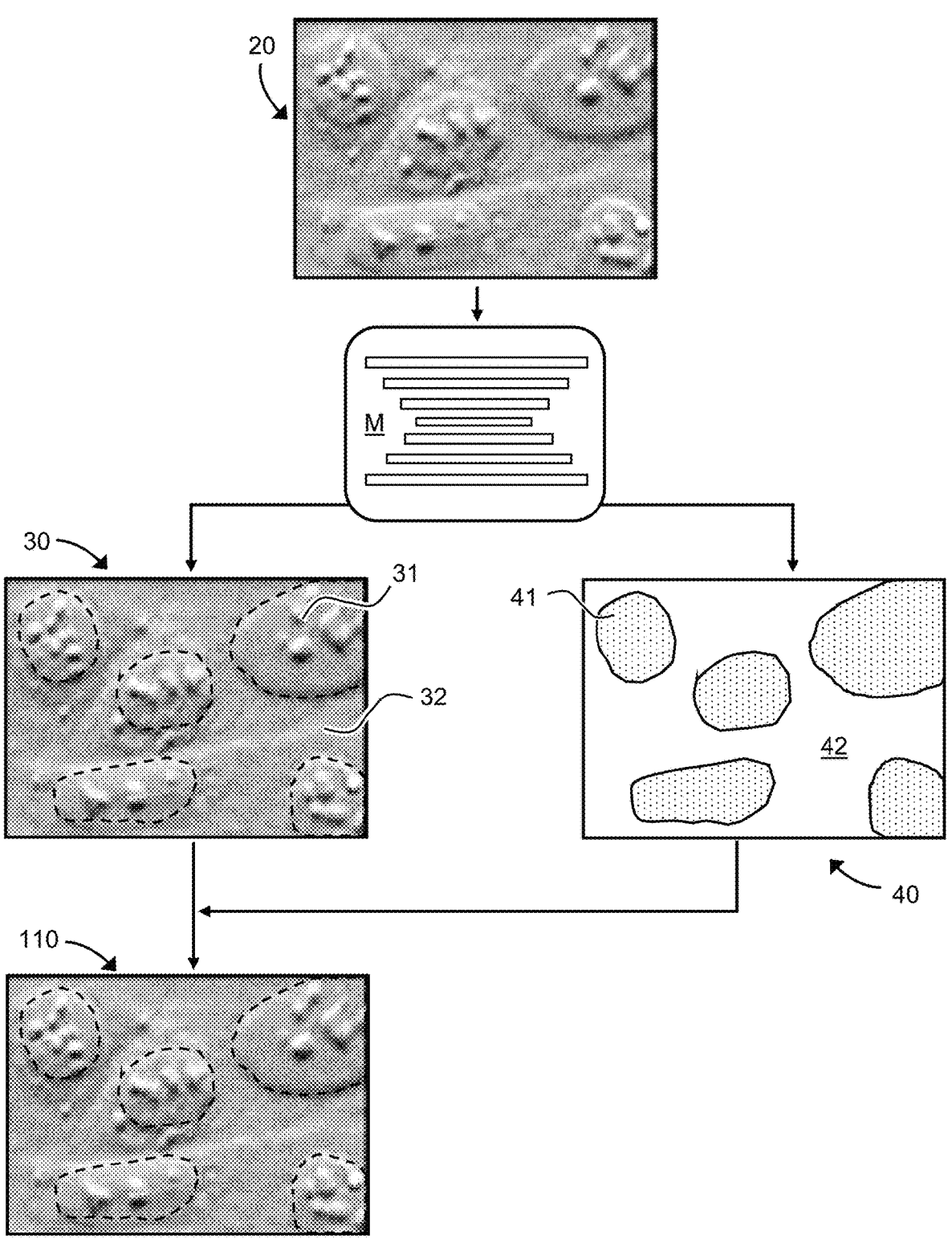
FIG. 12 schematically shows processes of a further example embodiment of a method of the invention.

FIG. 12 shows an example embodiment of a method according to the invention for generating a virtually stained image. In this case, the image processing model M is used in the inference phase, that is, after completion of the training described in the foregoing, in order to process a microscope image 20 that was not part of the training data.

First, the microscope image 20 is obtained, e.g., loaded from a memory or captured by the microscope of FIG. 1.

The image processing model M then calculates both a virtually stained image 30 and a segmentation mask 40 from the microscope image 20.

Optionally, the virtually stained image 30 and the segmentation mask 40 can be used together in a calculation in order to generate a refined virtually stained image 110. For example, an appropriate multiplication of both images allows signals in the stained image regions 31 to be amplified when a locally corresponding area in the segmentation mask designates a stained image region 41. The virtually stained image 30, the segmentation mask 40 and/or the refined virtually stained image 110 can be displayed according to the choice of a user.

The variants described with reference to the different figures can be combined with one another. The described example embodiments are purely illustrative and variants of the same are possible within the scope of the attached claims.

LIST OF REFERENCE SIGNS

1 Microscope
2 Stand
3 Objective revolver
4 (Microscope) objective
5 Illumination device
6 Sample stage
7 Sample carrier
8 Microscope camera
9 Overview camera
9A Field of view of the overview camera
9B Mirror
10 Computing device
11 Computer program
12 Touchscreen
15 Training
16 Follow-up training
20 Microscope image
21 Sample structures
29 Microscope image reconstruction
30 Virtually stained image
31 Stained image regions of the image 30
32 Unstained image regions of the image 30
40 Calculated/predicted segmentation mask
41 Stained image regions of the segmentation mask 40
42 Unstained image regions of the segmentation mask 40
50 Target image
60, 60', 60" Chemically stained image
61 Stained image region in the chemically stained image
62 Unstained image region in the chemically stained image
65 Erroneously stained image region in the chemically stained image
66 Missing staining in the chemically stained image
70, 70' Predefined segmentation mask

71 Stained/to be stained image regions of the segmentation mask 70

72 Unstained/not to be stained image regions of the segmentation mask 70

75 Image region of the segmentation mask 70 that corresponds locally to the erroneously stained image region 65

76 Image region of the segmentation mask 70 that corresponds locally to the erroneously unstained image region 66

80 Segmentation mask

81 Stained image regions of the segmentation mask 80

82 Unstained image regions of the segmentation mask 80

90 Chemically stained image in the case of contaminations

91 Sample(s)

92 Dust particles, artefacts

92A Segmented image regions of the dust particles/artefacts

93 Lint

93A Segmented image regions of a piece of lint

94 Image with segmentation of the dust particles / artefacts

95 Image with segmentation of the lint

96 Segmentation mask of the chemically stained image 90

97 Corrected segmentation mask

100 Microscopy system

110 Refined virtually stained image

A Autoencoder

D1, D2, D3 Decoders

E Encoder

F Feature vector generated by the encoder E $L_{CONS}$ Consistency reward/loss function $L_{SEG}$ Segmentation reward/loss function $L_{STAIN}$ Staining reward/loss function M Image processing model T Training data for learning the image processing model M W Weighting W1, W2 Weighting factors

The invention claimed is:

1. A computer-implemented method for generating an image processing model in order to calculate a virtually stained image from a microscope image, the method comprising:
   training the image processing model using training data comprising at least:
      microscope images as input data into the image processing model, and
      target images formed using captured chemically stained images that are registered locally in relation to the microscope images;
   wherein the image processing model is trained to calculate virtually stained images from the input microscope images by optimizing a staining reward/loss function that captures a difference between the virtually stained images and the target images;
   wherein the training data additionally comprises predefined segmentation masks, wherein the predefined segmentation masks discriminate between image regions to be stained and image regions that are not to be stained;
   wherein the predefined segmentation masks are taken into account in the training of the image processing model to compensate errors in the chemically stained images;
   wherein the image processing model is trained to calculate not only a virtually stained image but also a segmentation mask from an input microscope image, wherein in the training a segmentation reward/loss function to be optimized is used, which captures differences between the segmentation masks calculated by the image processing model and the predefined segmentation masks.

2. The computer-implemented method according to claim 1, wherein the predefined segmentation masks are taken into account when the target images are formed from the chemically stained images and/or in the staining reward/loss function.

3. The computer-implemented method according to claim 1, further comprising:
   taking into account the predefined segmentation masks for a variable weighting in the staining reward/loss function by weighting differences between the virtually stained images and the target images differently for different image regions as a function of the predefined segmentation masks.

4. The computer-implemented method according to claim 3, wherein an image region that is stained in one of the chemically stained images is given a weaker weighting if a locally corresponding image region in the associated predefined segmentation mask is designated as not to be stained.

5. The computer-implemented method according to claim 3, wherein a weighting of an image region that is designated as to be stained in one of the predefined segmentation masks is defined as a function of a stain strength in a locally corresponding image region of the associated chemically stained image,
   wherein the weighting is lower when the stain strength is weaker.

6. The computer-implemented method according to claim 1, further comprising:
   generating the target images from the chemically stained images and the associated predefined segmentation masks by deleting or computationally destaining stained image regions of a chemically stained image if the locally corresponding image regions in the associated predefined segmentation mask are designated as not to be stained.

7. The computer-implemented method according to claim 1, wherein image regions of lint or other artefacts, which do not belong to a sample to be analyzed and which appear in the chemically stained images as stained image regions, are registered in the predefined segmentation masks as image regions that are not to be stained.

8. The computer-implemented method according to claim 1, wherein an artefact detection program is run to generate a predefined segmentation mask,
   wherein the artefact detection program classifies regions to be stained in a segmentation mask as artefacts as a function of their shape and size, and
   wherein the artefact detection program registers image regions that have been classified as artefacts in the segmentation mask as image regions that are not to be stained.

9. The computer-implemented method according to claim 1, wherein in the training a consistency reward/loss function to be optimized is used, which captures a consistency between a virtually stained image calculated by the image processing model and a segmentation mask calculated by the image processing model.

10. The computer-implemented method according to claim 9, wherein in the training the staining reward/loss function, the segmentation reward/loss function, and the consistency reward/loss function are optimized together.

11. The computer-implemented method according to claim 1, wherein the image processing model comprises an encoder-decoder structure in which the same encoder is used with different decoders to calculate the virtually stained image and the calculated segmentation mask.

12. The computer-implemented method according to claim 1, wherein the image processing model is trained to calculate not only a virtually stained image and a segmentation mask from an input microscope image, but also to calculate, acting as an autoencoder, a microscope image reconstruction which shall correspond with the input microscope image;

wherein the image processing model comprises an encoder-decoder structure in which the same encoder is used with different decoders to calculate the virtually stained image, the calculated segmentation mask and the microscope image reconstruction.

13. A computer-implemented method for generating a virtually stained image, comprising:

obtaining a microscope image;

calculating a virtually stained image using the microscope image by means of an image processing model generated according to claim 12.

14. The computer-implemented method according to claim 13, wherein a calculated segmentation mask is also formed from an input microscope image by means of the image processing model;

wherein a refined virtually stained image is calculated by multiplying the virtually stained image by the calculated segmentation mask.

15. The computer-implemented method according to claim 13, wherein the image processing model calculates, acting as an autoencoder, a microscope image reconstruction from the microscope image;

wherein the microscope image is classified to appear suitable for the image processing model as a function of differences between the microscope image and the microscope image reconstruction.

16. The computer-implemented method according to claim 1, wherein after completion of the training a follow-up training of the image processing model is carried out, wherein in the follow-up training:

only a part of the image processing model that generates virtually stained images is trained further; while a part of the image processing model that generates calculated segmentation masks is kept constant in the follow-up training;

training data comprising microscope images and captured chemically stained images but no predefined segmentation masks is used;

the image processing model generates a calculated segmentation mask for each of the microscope images;

the calculated segmentation masks are used to compensate errors in the chemically stained images.

17. The computer-implemented method according to claim 16, wherein in the follow-up training a consistency reward/loss function to be optimized is used, which captures a consistency between a virtually stained image calculated by the image processing model and a segmentation mask calculated by the image processing model.

18. The computer-implemented method according to claim 16, wherein a number of microscope images and associated chemically stained images used in the follow-up training is greater than a number of microscope images and associated chemically stained images used in the previous training.

19. A non-transitory computer-readable medium, comprising commands, which, when executed by a computer, cause the computer to execute the method according to claim 1.

20. A microscopy system comprising:

a microscope for image capture; and a computing device that is configured to carry out a computer-implemented method for generating an image processing model in order to calculate a virtually stained image from a microscope image, the method comprising:

training the image processing model using training data comprising at least:

microscope images as input data into the image processing model, and target images formed using captured chemically stained images that are registered locally in relation to the microscope images;

wherein the image processing model is trained to calculate virtually stained images from the input microscope images by optimizing a staining reward/loss function that captures a difference between the virtually stained images and the target images;

wherein the training data additionally comprises predefined segmentation masks, wherein the predefined segmentation masks discriminate between image regions to be stained and image regions that are not to be stained;

wherein the predefined segmentation masks are taken into account in the training of the image processing model to compensate errors in the chemically stained images;

wherein the computing device is configured to display to a user microscope images, associated chemically stained images and an input tool via which the user can draw, correct or verify associated segmentation masks, and wherein these segmentation masks are then used as predefined segmentation masks in the training.

21. The microscopy system according to claim 20, wherein the image processing model is trained to calculate not only a virtually stained image but also a segmentation mask from an input microscope image, wherein in the training a segmentation reward/loss function to be optimized is used, which captures differences between the segmentation masks calculated by the image processing model and the predefined segmentation masks.

22. A computer-implemented method for generating an image processing model in order to calculate a virtually stained image from a microscope image, the method comprising:

training the image processing model using training data comprising at least:

microscope images as input data into the image processing model, and target images formed using captured chemically stained images that are registered locally in relation to the microscope images;

wherein the image processing model is trained to calculate virtually stained images from the input microscope images by optimizing a staining reward/loss function that captures a difference between the virtually stained images and the target images;

wherein the training data additionally comprises predefined segmentation masks, wherein the predefined segmentation masks discriminate between image regions to be stained and image regions that are not to be stained;

wherein the predefined segmentation masks are taken into account in the training of the image processing model to compensate errors in the chemically stained images; and taking into account the predefined segmentation masks for a variable weighting in the staining reward/loss function by weighting differences between the virtually stained images and the target images differently for different image regions as a function of the predefined segmentation masks.

* * * * *